(12) United States Patent
Ngo et al.

(10) Patent No.: US 10,528,502 B2
(45) Date of Patent: Jan. 7, 2020

(54) POWER MANAGEMENT SYSTEM FOR A BUS INTERFACE SYSTEM

(71) Applicant: RF Micro Devices, Inc.

(72) Inventors: Christopher Truong Ngo, Queen Creek, AZ (US); Alexander Wayne Hietala, Phoenix, AZ (US); Christian Rye Iversen, Vestbjerg (DK); Ruediger Bauder, Feldkirchen-Westerham (DE)

(73) Assignee: Qorvo US, Inc., Greensboro, NC (US)

(*) Notice: Subject to any disclaimer, the term of this patent is extended or adjusted under 35 U.S.C. 154(b) by 546 days.

(21) Appl. No.: 14/659,371

(22) Filed: Mar. 16, 2015

(65) Prior Publication Data

US 2015/0192974 A1  Jul. 9, 2015

Related U.S. Application Data

(63) Continuation-in-part of application No. 14/575,491, filed on Dec. 18, 2014, now Pat. No. 10,185,683.

(60) Provisional application No. 61/953,251, filed on Mar. 14, 2014, provisional application No. 61/917,610, filed on Dec. 18, 2013.

(51) Int. Cl.
*G06F 13/364* (2006.01)

(52) U.S. Cl.
CPC .................. *G06F 13/364* (2013.01)

(58) Field of Classification Search
CPC ........ G06F 13/36; G06F 13/38; G06F 13/385; G06F 13/40; G06F 2213/0016; G06F 2213/0024; G06F 2213/0026; G06F 13/4004; G06F 13/4027; G06F 2213/4002; G06F 12/0835; H04L 12/40052; H04L 2012/4026

USPC .......................................... 710/110, 305–306
See application file for complete search history.

(56) References Cited

U.S. PATENT DOCUMENTS

| 3,953,835 | A | * | 4/1976 | Cuccio | G06F 13/24 710/60 |
|---|---|---|---|---|---|
| 5,787,132 | A | | 7/1998 | Kishigami et al. | |
| 6,408,163 | B1 | * | 6/2002 | Fik | H04L 67/1095 455/3.01 |
| 6,484,268 | B2 | | 11/2002 | Tamura et al. | |
| 7,685,320 | B1 | | 3/2010 | Wishneusky | |

(Continued)

OTHER PUBLICATIONS

Non-Final Office Action for U.S. Appl. No. 14/575,491, dated May 26, 2017, 20 pages.

(Continued)

*Primary Examiner* — Tim T Vo
*Assistant Examiner* — Kim T Huynh
(74) *Attorney, Agent, or Firm* — Withrow & Terranova, P.L.L.C.

(57) ABSTRACT

Embodiments of bus interface systems are disclosed. In one embodiment, a bus interface system includes a master bus controller and a slave bus controller coupled along a bus line. The master bus controller is configured to generate an input data signal that is received by the slave bus controller along the bus line. The slave bus controller includes power conversion circuitry configured to convert the input data signal from the master bus controller into a supply voltage. By providing the power conversion circuitry, the slave bus controller is powered using the input data signal and without requiring an additional bus line to transfer a supply voltage to the slave bus controller.

31 Claims, 14 Drawing Sheets

(56) References Cited

U.S. PATENT DOCUMENTS

| | | | |
|---|---|---|---|
| 9,430,321 B2 | 8/2016 | Slik | |
| 9,519,612 B2 | 12/2016 | Hietala et al. | |
| 9,652,451 B2 | 5/2017 | Elder | |
| 2001/0050713 A1 | 12/2001 | Kubo et al. | |
| 2004/0049619 A1 | 3/2004 | Lin | |
| 2004/0100400 A1 | 5/2004 | Perelman et al. | |
| 2004/0128594 A1 | 7/2004 | Elmhurst et al. | |
| 2004/0221067 A1* | 11/2004 | Huang | G06F 13/4045 710/1 |
| 2005/0012492 A1 | 1/2005 | Mihalka | |
| 2006/0050694 A1 | 3/2006 | Bury et al. | |
| 2006/0152236 A1 | 7/2006 | Kim | |
| 2006/0236008 A1 | 10/2006 | Asano et al. | |
| 2009/0248932 A1* | 10/2009 | Taylor | G06F 13/24 710/110 |
| 2011/0035632 A1 | 2/2011 | Hong et al. | |
| 2011/0113171 A1 | 5/2011 | Radhakrishnan et al. | |
| 2012/0027104 A1 | 2/2012 | Bas et al. | |
| 2012/0030753 A1 | 2/2012 | Bas et al. | |
| 2012/0226965 A1 | 9/2012 | Hammerschmidt et al. | |
| 2012/0303836 A1 | 11/2012 | Ngo et al. | |
| 2013/0054850 A1 | 2/2013 | Co | |
| 2013/0124763 A1 | 5/2013 | Kessler | |
| 2013/0132624 A1 | 5/2013 | Chen et al. | |
| 2013/0197920 A1 | 8/2013 | Lesso et al. | |
| 2013/0265884 A1 | 10/2013 | Brombal et al. | |
| 2013/0301689 A1 | 11/2013 | Marchand et al. | |
| 2014/0025999 A1 | 1/2014 | Kessler | |
| 2014/0376278 A1 | 12/2014 | Fornage et al. | |
| 2015/0056941 A1 | 2/2015 | Lin et al. | |
| 2015/0074306 A1 | 3/2015 | Ayyagari et al. | |
| 2015/0106541 A1 | 4/2015 | Southcombe et al. | |
| 2015/0127862 A1 | 5/2015 | Fan et al. | |
| 2016/0050513 A1 | 2/2016 | Wang et al. | |
| 2016/0124892 A1 | 5/2016 | Amarilio et al. | |

OTHER PUBLICATIONS

Non-Final Office Action for U.S. Appl. No. 14/659,379, dated Apr. 7, 2017, 37 pages.
Non-Final Office Action for U.S. Appl. No. 14/659,292, dated Sep. 29, 2017, 27 pages.
Non-Final Office Action for U.S. Appl. No. 14/659,328, dated Sep. 8, 2017, 51 pages.
Non-Final Office Action for U.S. Appl. No. 14/659,355, dated Sep. 20, 2017, 32 pages.
Final Office Action for U.S. Appl. No. 14/659,379, dated Oct. 18, 2017, 44 pages.
Non-Final Office Action for U.S. Appl. No. 14/575,491, dated Nov. 30, 2017, 18 pages.
Advisory Action for U.S. Appl. No. 14/659,379, dated Feb. 26, 2018, 3 pages.
Advisory Action for U.S. Appl. No. 14/659,292, dated Aug. 10, 2018, 3 pages.
Notice of Allowance for U.S. Appl. No. 14/659,328, dated Jul. 2, 2018, 8 pages.
Advisory Action for U.S. Appl. No. 14/659,355, dated Jul. 5, 2018, 3 pages.
Non-Final Office Action for U.S. Appl. No. 15/467,790, dated Jun. 28, 2018, 14 pages.
Ex Parte Quayle Action for U.S. Appl. No. 15/365,315, mailed Jul. 26, 2018, 7 pages.
Notice of Allowance for U.S. Appl. No. 15/472,756, dated Aug. 8, 2018, 8 pages.
Notice of Allowance and Examiner-Initiated Interview Summary for U.S. Appl. No. 15/365,315, dated Sep. 14, 2018, 9 pages.
Final Office Action for U.S. Appl. No. 14/659,292, dated Apr. 30, 2018, 24 pages.
Final Office Action for U.S. Appl. No. 14/659,328, dated Mar. 20, 2018, 61 pages.
Final Office Action for U.S. Appl. No. 14/659,355, dated Apr. 17, 2018, 11 pages.
Notice of Allowance for U.S. Appl. No. 14/659,379, dated Mar. 20, 2018, 10 pages.
Non-Final Office Action for U.S. Appl. No. 15/365,295, dated Mar. 29, 2019, 15 pages.
Advisory Action for U.S. Appl. No. 15/467,790, dated Feb. 26, 2019, 3 pages.
Final Office Action for U.S. Appl. No. 14/659,355, dated May 2, 2019, 8 pages.
Non-Final Office Action for U.S. Appl. No. 14/659,292, dated Dec. 21, 2018, 23 pages.
Non-Final Office Action for U.S. Appl. No. 14/659,355, dated Oct. 12, 2018, 8 pages.
Final Office Action for U.S. Appl. No. 15/467,790, dated Nov. 5, 2018, 15 pages.
Non-Final Office Action for U.S. Appl. No. 15/443,236, dated Nov. 16, 2018, 19 pages.
U.S. Appl. No. 14/575,491, filed Dec. 18, 2014.
U.S. Appl. No. 14/659,292, filed Mar. 16, 2015.
U.S. Appl. No. 14/659,328, filed Mar. 16, 2015.
U.S. Appl. No. 14/659,355, filed Mar. 16, 2015.
U.S. Appl. No. 14/659,379, filed Mar. 16, 2015.
Final Office Action for U.S. Appl. No. 14/659,292, dated Jun. 4, 2019, 24 pages.
Non-Final Office Action for U.S. Appl. No. 15/886,209, dated May 17, 2019, 7 pages.
Notice of Allowance for U.S. Appl. No. 15/467,790, dated May 20, 2019, 8 pages.
Final Office Action for U.S. Appl. No. 15/443,236, dated May 30, 2019, 20 pages.
Author Unknown, "1-Wire," Wikipedia, last modified Jan. 16, 2015, accessed Feb. 12, 2015, http://en.wikipedia.org/wiki/1-Wire, 4 pages.
Author Unknown, "DS1822: Econo 1-Wire Digital Thermometer," Maxim Integrated, 2007, 21 pages.
Author Unknown, "MAXIM 1-Wire® Tutorial," MAXIM, online audiovisual presentation, 17 slides, No Date, accessed Feb. 12, 2015, http://www.maximintegrated.com/products/1-wire/flash/overview/ (38 images of slides).
Awtry, Dan, et al., "Design Guide v1.0," Springbok Digitronics, Aug. 19, 2004, 96 pages.
Notice of Allowance for U.S. Appl. No. 15/886,209, dated Sep. 11, 2019, 7 pages.
Final Office Action for U.S. Appl. No. 15/365,295, dated Aug. 15, 2019, 11 pages.
Notice of Allowance for U.S. Appl. No. 15/467,790, dated Aug. 15, 2019, 6 pages.
Notice of Allowance for U.S. Appl. No. 15/467,790, dated Aug. 28, 2019, 6 pages.
Notice of Allowance for U.S. Appl. No. 15/443,236, dated Sep. 24, 2019, 8 pages.

* cited by examiner

POWER MANAGEMENT SYSTEM FOR A BUS INTERFACE SYSTEM

RELATED APPLICATIONS

This application claims the benefit of provisional patent application Ser. No. 61/953,251, filed Mar. 14, 2014, the disclosure of which is hereby incorporated herein by reference in its entirety. This application is a continuation-in-part of U.S. patent application Ser. No. 14/575,491, filed Dec. 18, 2014, now U.S. Pat. No. 10,185,683, which claims priority to provisional patent application Ser. No. 61/917,610, filed Dec. 18, 2013.

The present application is related to concurrently filed U.S. patent application Ser. No. 14/659,292, entitled "START OF SEQUENCE DETECTION FOR ONE WIRE BUS;" concurrently filed U.S. patent application Ser. No. 14/659,328, now U.S. Pat. No. 10,282,269, entitled "READ TECHNIQUE FOR A BUS INTERFACE SYSTEM;" concurrently filed U.S. patent application Ser. No. 14/659,355, entitled "WRITE TECHNIQUE FOR A BUS INTERFACE SYSTEM;" and concurrently filed U.S. patent application Ser. No. 14/659,379, now U.S. Pat. No. 10,049,026, entitled "GROUP WRITE TECHNIQUE FOR A BUS INTERFACE SYSTEM."

All of the applications listed above are hereby incorporated herein by reference in their entireties.

FIELD OF THE DISCLOSURE

This disclosure relates generally to digital bus interfaces.

BACKGROUND

Digital bus interfaces are used to communicate data between components within an electronic device, such as a computer, a radio frequency (RF) front-end module, a cellular telephone, a tablet, a camera, and/or the like. The digital bus interface generally includes at least one master bus controller and one or more slave bus controllers. The master bus controller(s) and the slave bus controller(s) are connected by bus lines, and the master bus controller coordinates the transfer of data along the bus lines. The slave bus controllers perform commands (e.g., read and write commands) as coordinated by the master bus controller. If more than one master bus controller is provided, a bus arbitration scheme is generally implemented to negotiate between the various master bus controllers. The bus lines that connect the master bus controller(s) to the slave bus controllers typically include one or more data, power, and clock bus lines. Generally, the size of the digital bus interface increases as more bus lines are provided in the digital bus interface. The increase is due to the number of wires which must be routed between the bus controllers and the number of pins for the bus controllers that must be dedicated to the bus lines. In modern communication systems, the area available for pins and wires is minimal.

Therefore, digital bus interface designs that utilize fewer bus lines are needed.

SUMMARY

Embodiments of bus interface systems are disclosed. In one embodiment, a bus interface system includes a master bus controller and a slave bus controller coupled along a bus line. The master bus controller is configured to generate an input data signal that is received by the slave bus controller along the bus line. The slave bus controller includes power conversion circuitry configured to convert the input data signal from the master bus controller into a supply voltage. By providing the power conversion circuitry, the slave bus controller is powered using the input data signal and without requiring an additional bus line to transfer a supply voltage to the slave bus controller.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
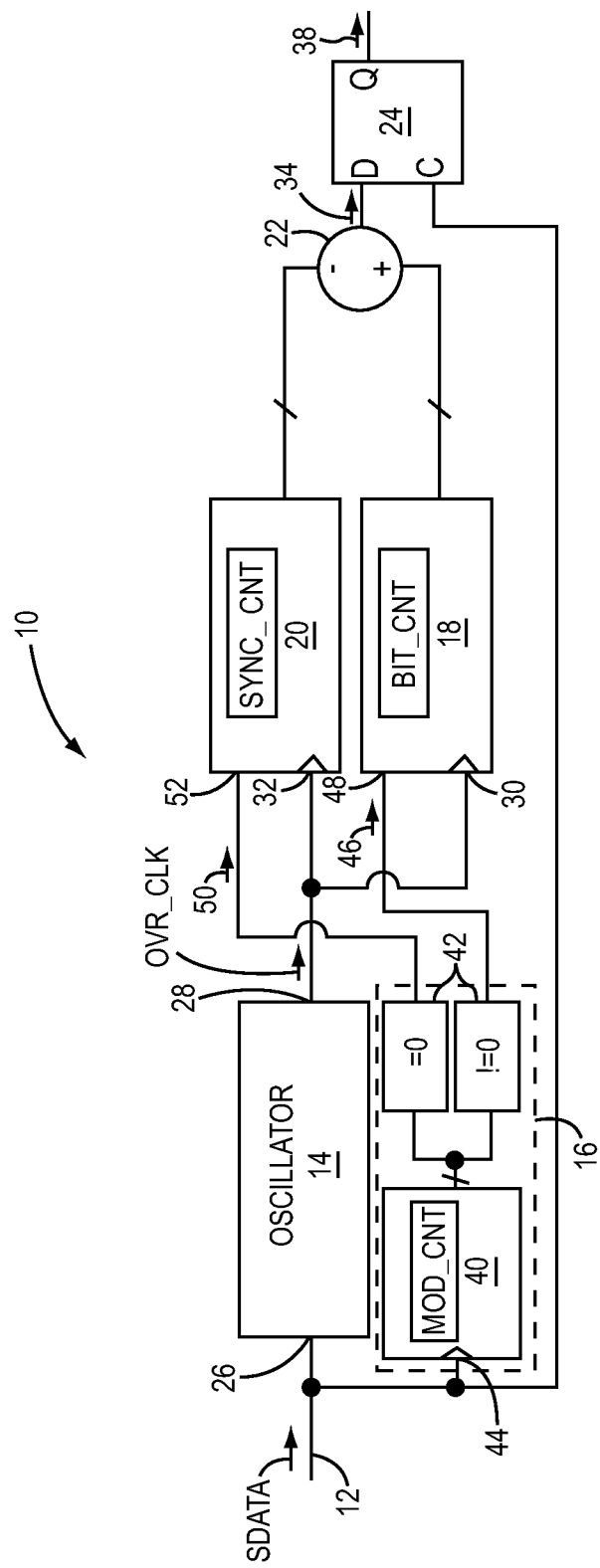
FIG. 1 illustrates one embodiment of a decoder, which may be provided in a bus controller of a bus interface system.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

With regard to the term "terminal," a terminal refers to any conductive feature in an electronic component for receiving signals, transmitting signals, and/or establishing a connection to another electronic component. For instance, a terminal may be one or more nodes, ports, conductive pads, pins, solder bumps, leads, pins, and/or the like.

When relative terminology, such as "approximately," "substantially," and the like are used in this disclosure, the relative terminology should be interpreted sensu lato but also in accordance to error tolerances dictated by performance parameters for a particular apparatus or method. These performance parameters may be described explicitly and/or implicitly by technical standard(s) relevant to an application that uses the particular apparatus or method to implement certain designed functions.

This disclosure relates generally to bus interface systems, components for bus interface systems, and related methods of operating the same. Embodiments of a bus interface system may be a digital bus interface system and may include various bus controllers connected by a bus line. For example, a bus interface system may include a master bus controller and a slave bus controller coupled by a bus line. Some embodiments of the bus interface system may be one wire bus interface systems where power, synchronization, payload information, and address information are all delivered to the slave bus controller on the bus line such that no other bus lines are provided between the master bus controller and the slave bus controller. More specifically, the master bus controller may be configured to generate an input data signal and transmit the input data signal on the bus line to the slave bus controller. The slave bus controller may include a decoder that extracts address information and payload information from the input data signal. As explained in further detail below, a bus protocol utilizing pulse width modulation (PWM) may be utilized where the decoder is clocked by the input data signal itself so that a separate clock signal does not have to be provided to the slave bus controller. Some embodiments of the slave bus controller may also include power conversion circuitry configured to convert the input data signal into a supply voltage. Accordingly, the slave bus controller may also be powered by the input data signal itself. In this manner, no other bus line has to be provided in the bus interface system in order to couple the master bus controller to the slave bus controller.

FIG. 1 illustrates one embodiment of a decoder 10, which may be provided in a bus controller of a bus interface system, such as a digital interface bus system. The decoder 10 is configured to receive an input data signal SDATA. The input data signal SDATA may be provided along a bus line 12 to the bus controller. The input data signal SDATA may define data pulses in order to represent data being transmitted along the bus line 12. For example, the input data signal SDATA may define data pulses such that logical values (e.g. bit values, logical symbols) are represented in accordance with a PWM bus protocol by the data pulses. More specifically, different logical values may be represented by a temporal duration of a data pulse during a time slot. As explained in further detail below, the PWM bus protocol also allows for the decoder 10 to be clocked by the input data signal SDATA itself, and thus an additional bus line does not have to be provided for a system clock signal in order to synchronize the decoder 10.

With regard to the input data signal SDATA, the data pulses defined by the input data signal SDATA are provided during time slots. More specifically, each of the data pulses may be provided during a different one of the time slots. The PWM bus protocol may organize the data pulses into data frames, where the data frame includes a certain number of the data pulses provided during a certain number of time slots. A temporal length of the time slots and thus of the data frame may be defined by the PWM bus protocol. For example, the PWM bus protocol may also allow for a bus address and a payload to be provided during certain time slots of the data frame. Also, an initial time slot of the data frame may be utilized to calibrate the decoder 10 as explained in further detail below. Accordingly, both the bus address and the payload can be provided by the input data signal SDATA so that additional address or data bus lines do not have to be provided. Furthermore, since the input data signal SDATA can also be used to calibrate the decoder 10, additional clock lines also do not have to be provided to synchronize the decoder 10. In this manner, a bus controller with the decoder 10, such as a slave bus controller, can extract both a bus address and a payload without requiring additional bus lines.

As shown in FIG. 1, the decoder includes an oscillator 14, counter enabling circuitry 16, a first counter 18, a second counter 20, a comparison circuit 22 and a sequential state element 24. The oscillator 14 is operable to receive the input data signal SDATA from the bus line 12. As mentioned above, each of the data pulses may be provided during a different one of the time slots. In other words, the data pulses provided by the input data signal SDATA may correspond injectively with the time slots.

In this embodiment, the oscillator 14 includes an enabling terminal 26 and is coupled to the bus line 12 so that the input data signal SDATA is received at the enabling terminal 26. In this manner, the oscillator 14 is configured to be enabled by the data pulses of the input data signal SDATA. In other words, the oscillator 14 is triggered by an activating edge of each of the data pulses of the input data signal SDATA. The oscillator 14 is configured to generate oscillation pulses while enabled. The oscillator 14 shown in FIG. 1 is operable to provide an oscillation signal OVR_CLK from an output terminal 28 of the oscillator 14. While enabled, the oscillator 14 is configured to provide the oscillation signal OVR_CLK so that the oscillation signal OVR_CLK defines the oscillation pulses. The oscillator 14 is then deactivated in response to an end of the data pulse. More specifically, the oscillator 14 is deactivated and does not generate oscillation pulses in response to a deactivation edge of each of the data pulses of the input data signal SDATA. While deactivated, the oscillation signal OVR_CLK does not provide the oscillation pulses and thus does not provide the oscillation signal OVR_CLK. The oscillation signal OVR_CLK is held in a deactivation state while the oscillator 14 is not enabled and deactivated. Since the oscillator 14 is enabled by the data pulses of the input data signal SDATA and deactivated when the data pulses of the input data signal SDATA are not provided, the decoder 10 is more power efficient. For instance, little to no current may be drawn by the oscillator 14 when deactivated as a result of the input data signal SDATA being between the data pulses. When the oscillator 14 is deactivated, the oscillator 14 does not generate the oscillation pulses, and thus little to no power may be consumed by the oscillator 14 while deactivated.

In accordance with the PWM bus protocol, a pulse rate of the oscillation signal OVR_CLK is significantly greater than a pulse rate of the data pulses of the input data signal SDATA. For example, the oscillator 14 is configured to generate the oscillation pulses when enabled at a pulse rate that is at least three times greater than a pulse rate of the data pulses. Thus, for a particular data pulse provided during a particular time slot, a temporal duration (i.e., a pulse width) of the particular data pulse in the input data signal SDATA can be determined by the number of oscillation pulses provided in the oscillation signal OVR_CLK during the particular time slot. The PWM bus protocol assigns different temporal durations (i.e., different pulse widths) to different logical values. In this manner, the decoder 10 can count the number of oscillation pulses provided in the oscillation signal OVR_CLK during the particular time slot and thereby determine the logical value being represented by the particular data pulse during that particular time slot, as explained in further detail below. Note that how much greater the pulse rate of the oscillation signal OVR_CLK is with respect to the pulse rate of the input data signal SDATA may depend on various factors such as a cardinality of the set of logical values that can be represented by each of the data pulses and an acceptable error rate in discriminating between the different logical values. For example, it is easier to discriminate what logical value a data pulse represents if a set of logical values that can be represented by the data pulse only includes a bit value of "1" and a bit value "0." Thus, the pulse rate of the oscillation signal OVR_CLK can be lower if desired in this case. It is more difficult to discriminate what logical value a particular data pulse represents if the set of logical values includes logical symbols, such as "0," "1," "2." However, the greater the cardinality of the set of logical values that can be represented by the data pulse, the greater the informational efficiency of the PWM bus protocol.

As shown in FIG. 1, both the first counter 18 and the second counter 20 are configured to receive the oscillation signal OVR_CLK from the oscillator 14. More specifically, the first counter 18 includes an input terminal 30 coupled to the output terminal 28 of the oscillator 14 so that the first counter 18 receives the oscillation signal OVR_CLK at the input terminal 30. The second counter 20 includes an input terminal 32 coupled to the output terminal 28 of the oscillator 14 so that the second counter 20 receives the oscillation signal OVR_CLK at the input terminal 32. The first counter 18 and the second counter 20 are each enabled and disabled by the counter enabling circuitry 16.

The first counter 18 is operable to store a first count parameter BIT_CNT. While the first counter 18 is enabled by the counter enabling circuitry 16, the first counter 18 is configured to increment the first count parameter BIT_CNT in response to each of the oscillation pulses provided by the oscillation signal OVR_CLK. When the first counter 18 is disabled by the counter enabling circuitry, the first counter 18 holds the first count parameter BIT_CNT at its current value. The second counter 20 is operable to store the reference parameter SYNC_CNT. While the second counter 20 is enabled by the counter enabling circuitry 16, the second counter 20 is configured to increment the reference parameter SYNC_CNT in response to each of the oscillation pulses provided by the oscillation signal OVR_CLK. When the second counter 20 is disabled by the counter enabling circuitry 16, the second counter 20 holds the reference parameter SYNC_CNT at its current value.

The input data signal SDATA may be formatted in accordance with the PWM bus protocol so that the data pulses defined by the input data signal SDATA during the time slots are organized into data frames. For each data frame, an initial time slot may be a calibration time slot. The data pulse provided during the calibration time slot is a calibration pulse, which may be provided by a bus controller (e.g., a master bus controller as explained in further detail below) with a precise pulse duration. For example, a duty cycle of the calibration pulse may be approximately 50% with respect to the calibration time slot and thus be provided during half of the calibration time slot. The oscillator 14 is configured to be enabled by the calibration data pulse. As explained in further detail below, the counter enabling circuitry 16 is configured to disable the first counter 18 and enable the second counter 20 during the calibration time slot of the data frame. Also, the second counter 20 may have reset the reference parameter SYNC_CNT to an initial value (e.g., such as zero) prior to an activation edge of the calibration pulse. Thus, during the calibration time slot of each of the data frames, the second counter 20 is configured to count the oscillation pulses defined by the oscillation signal OVR_CLK. In this manner, the reference parameter SYNC_CNT indicates a reference number, and the reference number is based on how many of the oscillation pulses were generated by the oscillator 14 during the calibration time slot as a result of the calibration pulse. In this example, the reference number is equal to how many of the oscillation pulses were generated by the oscillator 14 during the calibration time slot. This reference number is used to determine logical values of a remainder of the data pulses provided in the data frame. By making the decoder 10 responsive to the calibration pulse as described above, the decoder 10 can be synchronized and calibrated by the input data signal SDATA itself without having to receive an external clock signal on another bus line. It should be noted that in other embodiments, the calibration time slot may be greater than the other time slots in the data frame. Thus, in these cases, the reference number may be equal to some fraction of the number of oscillation pulses that were generated by the oscillator during the calibration time slot. In this case, the second counter 20 may be configured to be incremented after a certain number of the oscillation pulses or may include division circuitry that divides the reference parameter SYNC_CNT by the appropriate integer after the calibration pulse so that the reference parameter SYNC_CNT is stored after the calibration time pulse to equal the appropriate fraction of the number of oscillation pulses that were generated by the oscillator during the calibration time slot.

In accordance with the PWM bus protocol, the remainder of the data pulses provided in the other time slots of the data frame may represent a bus address, a payload, and/or the like. To recover the logical value represented by a data pulse during a time slot, the first counter 18 is configured to count the oscillation pulses such that the first count parameter BIT_CNT indicates a number of the oscillation pulses generated during the time slot. More specifically, after the calibration time slot, the counter enabling circuitry 16 is configured to disable the second counter 20 and enable the first counter 18 in response to the data pulse defined by the input data signal SDATA during the time slot. Thus, for the remainder of the time slots in the data frame, the second counter 20 holds the reference parameter SYNC_CNT indicating the reference number, which is how many of the oscillation pulses were generated by the oscillator during the calibration time slot as a result of the calibration pulse.

The first counter 18 is configured to reset the first count parameter BIT_CNT to an initial value (e.g., zero) in response to the activation edge of the data pulse. In response to the data pulse defined by the input data signal SDATA during the time slot, the oscillator 14 is configured to be enabled by the data pulse of the input data signal SDATA and generate oscillation pulses while enabled. The first counter 18 (which has been enabled by the counter enabling circuitry 16) is configured to increment the first count parameter BIT_CNT in response to the oscillation pulses from the oscillator 14. Thus, for each of the data pulses provided after the calibration time slot, the first counter 18 is configured to count the oscillation pulses defined by the oscillation signal OVR_CLK such that the first count parameter BIT_CNT indicates a number of the oscillation pulses generated during the time slot. The oscillation pulses defined by the oscillation signal OVR_CLK were generated as a result of the data pulse of the input data signal SDATA. In this manner, the first count parameter BIT_CNT indicates how many of the oscillation pulses were generated during the time slot during the data pulse of the input data signal SDATA.

To determine the logical value of the data pulse from the first count parameter BIT_CNT, the comparison circuit 22 is configured to compare the first count parameter BIT_CNT with the reference parameter SYNC_CNT. As explained above, the reference parameter SYNC_CNT indicates the reference number, which is a count of the oscillation pulses that were generated by the oscillator 14 during the calibration time slot as a result of the calibration pulse at the beginning of the data frame. The PWM bus protocol may define a set of logical values that may be represented by each of the data pulses provided during the time slots of the data frame after the calibration time slot. The comparison circuit 22 is configured to generate a data output 34 such that the data output 34 represents a first logical value in response to the first count parameter BIT_CNT being greater than the reference parameter SYNC_CNT and such that the data output 34 represents a second logical value in response to the first count parameter BIT_CNT being less than the reference parameter SYNC_CNT.

For a bit scheme, the set of logical values may be the set of bit values [0, 1]. In the embodiment shown in FIG. 1, the comparison circuit 22 is configured to the data output 34 as a data output signal such that the data output signal represents an output bit. The output bit is a first bit value (e.g., bit value of 1 in the set of bit values [0, 1]) if the first count parameter BIT_CNT is greater than the reference parameter SYNC_CNT. For example, in this case, the data pulse defined during the time slot by the data pulse of the input data signal SDATA had a temporal duration that was longer than a temporal duration of the calibration pulse defined by the data pulse of the input data signal SDATA during the calibration time slot. As a result, the number of oscillation pulses provided by the oscillation signal OVR_CLK during this time slot is greater than the number of oscillation pulses provided during the calibration time slot. Thus, the comparison circuit 22 will determine that the first count parameter BIT_CNT is greater than the reference parameter SYNC_CNT and generate the data output 34 such that the data output 34 represents the first bit value (e.g., the bit value 1).

The output bit is a second bit value (e.g., bit value of 0 in the set of bit values [0, 1]) if the first count parameter BIT_CNT is less than the reference parameter SYNC_CNT.

In this case, the data pulse defined during the time slot by the data pulse of the input data signal SDATA had a temporal duration that was shorter than a temporal duration of the calibration pulse defined by the data pulse of the input data signal SDATA during the calibration time slot. As a result, the number of oscillation pulses provided by the oscillation signal OVR_CLK during this time slot is less than the number of oscillation pulses provided during the calibration time slot. Thus, the comparison circuit 22 will determine that the first count parameter BIT_CNT is less than the reference parameter SYNC_CNT and generate the data output 34 such that the data output 34 represents the second bit value (e.g., the bit value 0).

The sequential state element 24 is configured to receive the data output 34 and store the output bit represented by the data output 34, which in this example is provided by a data output signal. In this example, the sequential state element 24 is a flip-flop that has a data input terminal D, a clock terminal C, and a data output terminal Q. The data output 34 (e.g., the data output signal) is received by the sequential state element 24 at the data input terminal D. The input data signal SDATA is received at the clock terminal C and thus is used to clock the sequential state element 24. A memory input signal 38 is generated at the data output terminal Q so that the bit value stored by the sequential state element 24 is provided to memory outside of the decoder 10. As explained below, in other embodiments, the set of logical values that can be represented by the data pulses may be logical symbols. In this case, the data output 34 may have multiple data output signals in order to represent multiple bits. Thus, additional sequential state elements (not explicitly shown) may be provided to store the various bits.

As shown in FIG. 1, the comparison circuit 22 is provided as a subtractor that is configured to compare the first count parameter BIT_CNT with the reference parameter SYNC_CNT by subtracting the first count parameter BIT_CNT and the reference parameter SYNC_CNT. In this embodiment, the comparison circuit 22 is configured to subtract the first count parameter BIT_CNT from the reference parameter SYNC_CNT to determine a difference between the first count parameter BIT_CNT and the reference parameter SYNC_CNT. If the difference is positive, the comparison circuit 22 circuit generates the data output 34 to represent the first bit value (e.g., the bit value 1). If the difference is negative, the comparison circuit 22 circuit generates the data output 34 to represent the second bit value (e.g., the bit value 0).

As mentioned above, the counter enabling circuitry 16 is configured to enable the second counter 20 and disable the first counter 18 during a calibration time slot of the data frame and enable the first counter 18 and disable the second counter 20 during time slots of the data frame after the calibration time slot. To do this, the counter enabling circuitry 16 shown in FIG. 1 includes a modulo counter 40 and a logical network 42. The modulo counter 40 is operable to store a modulo counter parameter MOD_CNT and receive the input data signal SDATA at an input terminal 44. The modulo counter 40 is configured to increment the modulo counter parameter MOD_CNT in response to each of the data pulses defined by input data signal SDATA, including the calibration pulse and the other data pulses defined during the time slots of a data frame.

Since the modulo counter 40 is modulo, the modulo counter parameter MOD_CNT wraps around to cycle through an initial value to a final value and back to the initial value to cycle through the values again. The cycle can be set in accordance with the number of time slots provided in each data frame. For example, if the number of time slots in each data frame is an integer N and the initial value is zero (0), then the modulo counter 40 can be configured to cycle the modulo counter parameter MOD_CNT between the initial value of zero (0) and the final value of N−1. Accordingly, the initial value (e.g., zero (0)) can be used to indicate the initial time slot of a data frame, which in this embodiment is the calibration time slot that has the calibration pulse. Any other one of the values in the cycle is for time slots after the calibration time slot. The final value of N−1 indicates that the last time slot in the data frame has been reached. If the modulo counter parameter MOD_CNT is incremented again after reaching the final value of N−1, the modulo counter parameter MOD_CNT wraps back around to the initial value of zero (0) and thereby indicates the calibration time slot for the next data frame. The initial value of zero (0) is thus a calibration number that indicates the calibration time slot of the data frame. In this manner, the counter enabling circuitry 16 allows the decoder 10 to be synchronized with the various data frames provided with the input data signal SDATA.

The logical network 42 is configured to disable the first counter 18 and enable the second counter 20 such that the second counter 20 counts the oscillation pulses if the modulo counter parameter MOD_CNT is equal to a calibration number (e.g. zero (0)). In this example, the logical network 42 is configured to generate an enabling signal 46 received at an enabling terminal 48 of the first counter 18 and generate an enabling signal 50 received at an enabling terminal 52 of the second counter 20. The logical network 42 generates the enabling signal 46 in a deactivation state, and the enabling signal 50 in an activation state if the modulo counter parameter MOD_CNT is equal to a calibration number (e.g. zero (0)). As such, the first counter 18 is disabled and the second counter is enabled during the calibration time slot. However, the logical network 42 is configured to enable the first counter 18 and disable the second counter 20 such that the first counter 18 counts the oscillation pulses if the modulo counter parameter MOD_CNT is not equal to the calibration number. Thus, the logical network 42 shown in FIG. 1 generates the enabling signal 46 in the activation state and the enabling signal 50 in the deactivation state when the modulo counter parameter MOD_CNT is equal to any value from 1 to N−1. As such, the first counter 18 is enabled and the second counter is disabled during the time slots that are provided after the calibration time slot.

Figure 2:
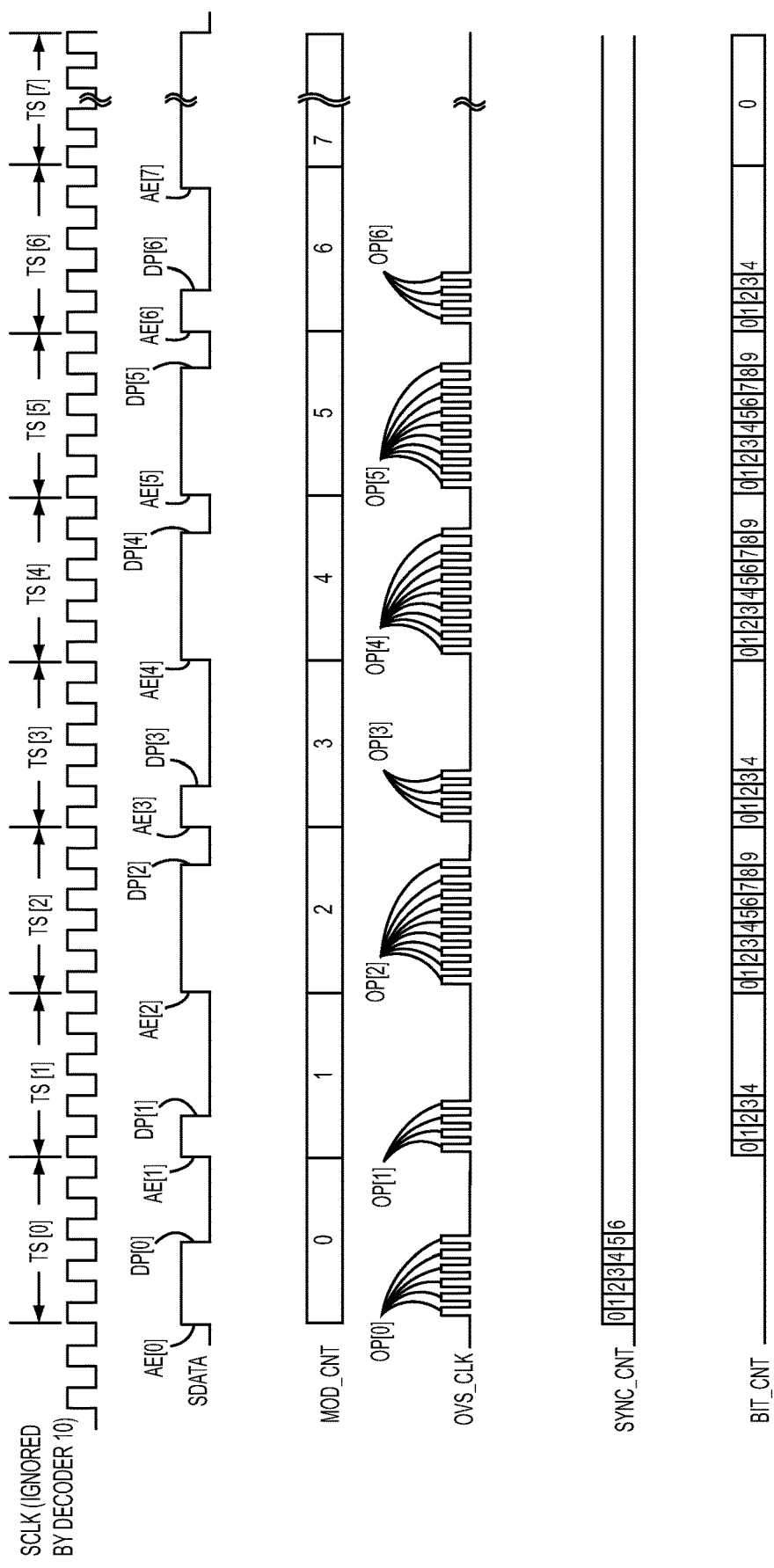
FIG. 2 illustrates a timing diagram for the decoder shown in FIG. 1 during an exemplary data frame provided in accordance to a one wire PWM bus protocol.

Referring now to FIG. 1 and FIG. 2, FIG. 2 illustrates a timing diagram for the decoder 10 shown in FIG. 1 during an exemplary data frame provided in accordance to a one wire PWM bus protocol. As shown in FIG. 2, the data frame in this example has eight time slots (referred to generally and generically as elements TS and specifically as elements TS[0]-TS[7]). The timing diagram shown in FIG. 2 illustrates signal levels and parameter values for embodiments of a system clock signal SCLK, the input data signal SDATA, the modulo counter parameter MOD_CNT, the oscillator signal OVS_CLK, the reference parameter SYNC_CNT, and the first counter parameter BIT_CNT as a function of time during the time slots of the data frame. The system clock signal SCLK is ignored by the decoder 10 and is not provided at all to the decoder 10 shown in FIG. 1. However, the system clock signal SCLK may be utilized by outside circuitry (such as a master bus controller) to generate the input data signal SDATA, as explained in further detail below. The system clock signal SCLK is being shown here to help clarify the timing diagram with respect to system timing despite the decoder 10 not utilizing the system clock signal SCLK. As shown in FIG. 2, a time duration of each of the time slots TS is approximately equal to four clock cycles.

The input data signal SDATA provided to the decoder 10 defines data pulses (referred to generally or generically as elements DP and specifically as elements DP[0] to DP[6]) during each of the time slots TS[1]-TS[6]. More specifically, a data pulse DP[0] is defined by the input data signal SDATA during a time slot TS[0]. This is the initial time slot, which is a calibration time slot. Thus, the data pulse DP[0] is a calibration data pulse. A duty cycle of the data pulse DP[0] is 50%, and thus the data pulse DP[0] is provided for half the time slot TS[0] and has a temporal duration equal to two clock cycles of the system clock signal SCLK. The PWM bus protocol in this example uses one of the time slots to communicate a one-bit command. A data pulse DP[1] is defined by the input data signal SDATA during a time slot TS[1]. The time slot TS[1] is a command time slot and the data pulse DP[1] represents a command bit. A duty cycle of the data pulse DP[1] is 25%, and thus the data pulse DP[1] is provided for one quarter of the time slot TS[1] and has a temporal duration equal to one clock cycle of the system clock signal SCLK.

The PWM bus protocol in this example uses two of the time slots to communicate a two-bit bus address. A data pulse DP[2] is defined by the input data signal SDATA during a time slot TS[2]. The time slot TS[2] is a bus address time slot, and the data pulse DP[2] represents an address bit for a bus address. A duty cycle of the data pulse DP[2] is 75%, and thus the data pulse DP[2] is provided for 3 quarters of the time slot TS[2] and has a temporal duration equal to three clock cycles of the system clock signal SCLK. A data pulse DP[3] is defined by the input data signal SDATA during a time slot TS[3]. The time slot TS[3] is also an address time slot, and the data pulse DP[3] represents another address bit for the bus address. A duty cycle of the data pulse DP[3] is 25% and thus the data pulse DP[3] is provided for one quarter of the time slot TS[3] and has a temporal duration equal to one clock cycle of the system clock signal SCLK.

The PWM bus protocol in this example uses three of the time slots TS to communicate a three-bit payload. A data pulse DP[4] is defined by the input data signal SDATA during a time slot TS[4]. The time slot TS[4] is a payload time slot, and the data pulse DP[4] represents a first data bit for the three-bit data payload. A duty cycle of the data pulse DP[4] is 75%, and thus the data pulse DP[4] is provided for 3 quarters of the time slot TS[4] and has a temporal duration equal to three clock cycles of the system clock signal SCLK. A data pulse DP[5] is defined by the input data signal SDATA during a time slot TS[5]. The time slot TS[5] is another payload time slot, and the data pulse DP[5] represents a second data bit for the three-bit data payload. A duty cycle of the data pulse DP[5] is 75%, and thus the data pulse DP[5] is provided for 3 quarters of the time slot TS[5] and has a temporal duration equal to three clock cycles of the system clock signal SCLK. A data pulse DP[6] is defined by the input data signal SDATA during a time slot TS[6]. The time slot TS[6] is yet another payload time slot, and the data pulse DP[6] represents a third data bit for the three-bit data payload. A duty cycle of the data pulse DP[6] is 25%, and thus the data pulse DP[6] is provided for a quarter of the time slot TS[6] and has a temporal duration equal to one clock cycle of the system clock signal SCLK. A time slot TS[7] is a set up time slot for the next data frame. During the time slot TS[7], the input data signal SDATA is held high. The time slot TS[7] may extend for any period of time, and thus may be longer than the time slots TS[1]-TS[6].

As shown in FIG. 2, the modulo counter parameter MOD_CNT is provided to equal the calibration number of zero (0) during the time slot TS[0], which is the calibration time slot. The counter enabling circuitry 16 is thus configured to enable the second counter 20 and disable the first counter 18. The oscillator 14 is configured to be enabled by the data pulse DP[0], which is the calibration pulse provided during the calibration time slot (i.e., TS[0]). The reference parameter SYNC_CNT of the second counter 20 may have been reset to an initial value of zero (0) prior to an activation edge AE[0] of the data pulse DP[0]. The second counter 20 is configured to count the oscillation pulses OP[0] defined by the oscillation signal OVR_CLK during the time slot TS[0] as a result of the data pulse DP[0] (the calibration pulse). More specifically, the second counter 20 is configured to increment the reference parameter SYNC_CNT as a result of each of the oscillation pulses OP[0] defined by the oscillation signal OVR_CLK during the time slot TS[0]. In this example, the reference parameter SYNC_CNT is set equal to a reference number of six (6) as a result of the six oscillation pulses OP[0] generated as a result of the data pulse DP[0] during the time slot TS[0]. As a result of the end of the data pulse DP[0], no more of the oscillation pulses OP[0] are generated, and the oscillation signal OVS_CLK is held in a deactive state for a remainder of the time slot TS[0]. Accordingly, the reference parameter SYNC_CNT indicates the reference number of six (6), which is how many of the oscillation pulses OP[0] were generated by the oscillator 14 during the time slot TS[0] (i.e., the calibration time slot) as a result of the data pulse DP[0] (i.e., the calibration pulse).

The modulo counter parameter MOD_CNT is provided to equal the number of one (1) during the time slot TS[1], which is the command time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[1], which is the command time slot. The first counter 18 may be configured to reset the first count parameter BIT_CNT to an initial value of zero (0) in response to an activation edge AE[1] of the data pulse DP[1]. The first counter 18 is configured to count the oscillation pulses OP[1] defined by the oscillation signal OVR_CLK during the time slot TS[1] as a result of the data pulse DP[1] (the command pulse), which had a 25% duty cycle.

More specifically, the first counter 18 is configured to increment the first count parameter BIT_CNT as a result of each of the oscillation pulses OP[1] defined by the oscillation signal OVR_CLK during the time slot TS[1]. In this example, the first count parameter BIT_CNT is set equal to a number of four (4) as a result of the four oscillation pulses OP[1] generated as a result of the data pulse DP[1] during the time slot TS[1]. As a result of the end of the data pulse DP[1], no more of the oscillation pulses OP[1] are generated and the oscillation signal OVS_CLK is held in a deactive state for a remainder of the time slot TS[1]. Accordingly, the first count parameter BIT_CNT indicates a number of four (4), which is how many of the oscillation pulses OP[1] were generated by the oscillator 14 during the time slot TS[1] (i.e., the command time slot) as a result of the data pulse DP[1] (i.e., a command pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The command bit has thus been recovered in this case to equal the bit value of 0, which may indicate a write command. If the command bit had been a bit value of 1, this may have indicated a read command.

The modulo counter parameter MOD_CNT is provided to equal the number of two (2) during the time slot TS[2], which is a first address time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[2], which is a first address time slot. The first counter 18 may be configured to reset the first count parameter BIT_CNT to an initial value of zero (0) in response to an activation edge AE[2] of the data pulse DP[2]. The first counter 18 is configured to count the oscillation pulses OP[2] defined by the oscillation signal OVR_CLK during the time slot TS[2] as a result of the data pulse DP[2] (i.e., a first address pulse), which has a 75% duty cycle.

More specifically, the first counter 18 is configured to increment the first count parameter BIT_CNT as a result of each of the oscillation pulses OP[2] defined by the oscillation signal OVR_CLK during the time slot TS[2]. In this example, the first count parameter BIT_CNT is set equal to a number of nine (9) as a result of the nine oscillation pulses OP[2] generated as a result of the data pulse DP[2] during the time slot TS[2]. As a result of the end of the data pulse DP[2], no more of the oscillation pulses OP[2] are generated, and the oscillation signal OVS_CLK is held in a deactive state for a remainder of the time slot TS[2]. Accordingly, the first count parameter BIT_CNT indicates a number of nine (9), which is how many of the oscillation pulses OP[2] were generated by the oscillator 14 during the time slot TS[2] (i.e., the first address time slot) as a result of the data pulse DP[2] (i.e., the first address pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The first address bit has thus been recovered in this case to equal a bit value of 1.

The modulo counter parameter MOD_CNT is provided to equal the number of three (3) during the time slot TS[3], which is a second address time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[3], which is a second address time slot. The first counter 18 may be configured to reset the first count parameter BIT_CNT to an initial value of zero (0) in response to an activation edge AE[3] of the data pulse DP[3]. The first counter 18 is configured to count the oscillation pulses OP[3] defined by the oscillation signal OVR_CLK during the time slot TS[3] as a result of the data pulse DP[3] (i.e., a second address pulse), which has a 25% duty cycle.

More specifically, the first counter 18 is configured to increment the first count parameter BIT_CNT as a result of each of the oscillation pulses OP[3] defined by the oscillation signal OVR_CLK during the time slot TS[3]. In this example, the first count parameter BIT_CNT is set equal to a number of four (4) as a result of the four oscillation pulses OP[3] generated as a result of the data pulse DP[3] during the time slot TS[3]. As a result of the end of the data pulse DP[3], no more of the oscillation pulses OP[3] are generated, and the oscillation signal OVS_CLK is held in a deactive state for a remainder of the time slot TS[3]. Accordingly, the first count parameter BIT_CNT indicates a number of four (4), which is how many of the oscillation pulses OP[3] were generated by the oscillator 14 during the time slot TS[3] (i.e., the second address time slot) as a result of the data pulse DP[3] (i.e., the second address pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The second address bit has thus been recovered in this case to equal a bit value of 0.

The modulo counter parameter MOD_CNT is provided to equal a number of four (4) during the time slot TS[4], which is a first payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[4], which is the first payload time slot. The first counter 18 may be configured to reset the first count parameter BIT_CNT to an initial value of zero (0) in response to an activation edge AE[4] of the data pulse DP[4]. The first counter 18 is configured to count the oscillation pulses OP[4] defined by the oscillation signal OVR_CLK during the time slot TS[4] as a result of the data pulse DP[4] (i.e., a first payload pulse), which has a 75% duty cycle.

More specifically, the first counter 18 is configured to increment the first count parameter BIT_CNT as a result of each of the oscillation pulses OP[4] defined by the oscillation signal OVR_CLK during the time slot TS[4]. In this example, the first count parameter BIT_CNT is set equal to a number of nine (9) as a result of the nine oscillation pulses OP[4] generated as a result of the data pulse DP[4] during the time slot TS[4]. As a result of the end of the data pulse DP[4], no more of the oscillation pulses OP[4] are generated, and the oscillation signal OVS_CLK is held in a deactive state for a remainder of the time slot TS[4]. Accordingly, the first count parameter BIT_CNT indicates a number of nine (9), which is how many of the oscillation pulses OP[4] were generated by the oscillator 14 during the time slot TS[4] (i.e., the first payload time slot) as a result of the data pulse DP[4] (i.e., the first payload pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The first payload bit has thus been recovered in this case to equal a bit value of 1.

The modulo counter parameter MOD_CNT is provided to equal the number of five (5) during the time slot TS[5], which is a second payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[5], which is the second payload time slot. The first counter 18 may be configured to reset the first count parameter BIT_CNT to an initial value of zero (0) in response to an activation edge AE[5] of the data pulse DP[5]. The first counter 18 is configured to count the oscillation pulses OP[5] defined by the oscillation signal OVR_CLK during the time slot TS[5] as a result of the data pulse DP[5] (i.e., a second payload pulse), which has a 75% duty cycle.

More specifically, the first counter 18 is configured to increment the first count parameter BIT_CNT as a result of each of the oscillation pulses OP[5] defined by the oscillation signal OVR_CLK during the time slot TS[5]. In this example, the first count parameter BIT_CNT is set equal to a number of nine (9) as a result of the nine oscillation pulses OP[5] generated as a result of the data pulse DP[5] during the time slot TS[5]. As a result of the end of the data pulse DP[5], no more of the oscillation pulses OP[5] are generated, and the oscillation signal OVS_CLK is held in a deactive state for a remainder of the time slot TS[5]. Accordingly, the first count parameter BIT_CNT indicates a number of nine (9), which is how many of the oscillation pulses OP[5] were generated by the oscillator 14 during the time slot TS[5] (i.e., the second payload time slot) as a result of the data pulse DP[5] (i.e., the second payload pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The second payload bit has thus been recovered in this case to equal a bit value of 1.

Also, the modulo counter parameter MOD_CNT is provided to equal a number of six (6) during the time slot TS[6], which is a third payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[6], which is the third payload time slot. The first counter 18 may be configured to reset the first count parameter BIT_CNT to an initial value of zero (0) in response to an activation edge AE[6] of the data pulse DP[6]. The first counter 18 is configured to count the oscillation pulses OP[6] defined by the oscillation signal OVR_CLK during the time slot TS[6] as a result of the data pulse DP[6] (i.e., a third payload pulse), which has a 25% duty cycle.

More specifically, the first counter 18 is configured to increment the first count parameter BIT_CNT as a result of each of the oscillation pulses OP[6] defined by the oscillation signal OVR_CLK during the time slot TS[6]. In this example, the first count parameter BIT_CNT is set equal to a number of four (4) as a result of the four oscillation pulses OP[6] generated as a result of the data pulse DP[6] during the time slot TS[6]. As a result of the end of the data pulse DP[6], no more of the oscillation pulses OP[6] are generated, and the oscillation signal OVS_CLK is held in a deactive state for a remainder of the time slot TS[6]. Accordingly, the first count parameter BIT_CNT indicates a number of four (4), which is how many of the oscillation pulses OP[6] were generated by the oscillator 14 during the time slot TS[6] (i.e., the third payload time slot) as a result of the data pulse DP[6] (i.e., the third payload pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The third payload bit has thus been recovered in this case to equal a bit value of 0. Note that in this embodiment, the data pulses DP and oscillation pulses (referred to generally or generically as elements OP) are positive pulses. Other embodiments of the decoder 10 may be provided to operate with the data pulses DP and/or the oscillation pulses OP being negative pulses. For example, in another embodiment, the data pulses DP are negative pulses, while the oscillation pulses OP are positive pulses.

Finally, the modulo counter parameter MOD_CNT is provided to equal the number of seven (7) during the time slot TS[7], which is the setup time slot. The time slot TS[7] does not include a data pulse. Rather, the input data signal SDATA is held in the activation state during the entire time slot TS[7]. The counter enabling circuitry 16 is configured to deactivate the oscillator 14 so that the oscillator does not generate the oscillation pulses OP when the modulo counter parameter MOD_CNT is equal to 7 during the time slot TS[7]. Thus, oscillation pulses OP are not generated during the time slot TS[7]. The first counter 18 may be configured to reset the first count parameter BIT_CNT to an initial value of zero (0) in response to an activation edge AE[7] of input data signal SDATA during the time slot TS[7]. Similarly, the second counter 20 may be configured to reset the reference parameter SYNC_CNT to an initial value of zero (0) in response to an activation edge AE[7] of input data signal SDATA during the time slot TS[7]. In this manner, the decoder 10 is set up for the next data frame. The time slot TS[7] could extend for any period of time until the next data frame is ready to be communicated.

In the example described above in FIG. 2, the time slot D[0] has the same temporal duration as the time slots D[1]-D[6]. However, in other embodiments, the time slot D[0] (i.e., the calibration time slot) may be greater than the temporal duration of the time slots D[1]-D[6]. For example, the time slot D[0] may be four times as long as the temporal duration of the time slots D[1]-D[6]. Thus, in this case, the reference number may be equal to a quarter of the number of oscillation pulses OP[0] that were generated by the oscillator 14 during the calibration time slot. The second counter 20 may be configured to divide the reference parameter SYNC_CNT by four to equal the reference number of a quarter of the number of the oscillation pulses OP[0] that were generated by the oscillator 14 during the time slot D[0] (i.e., the calibration time slot).

Figure 3:
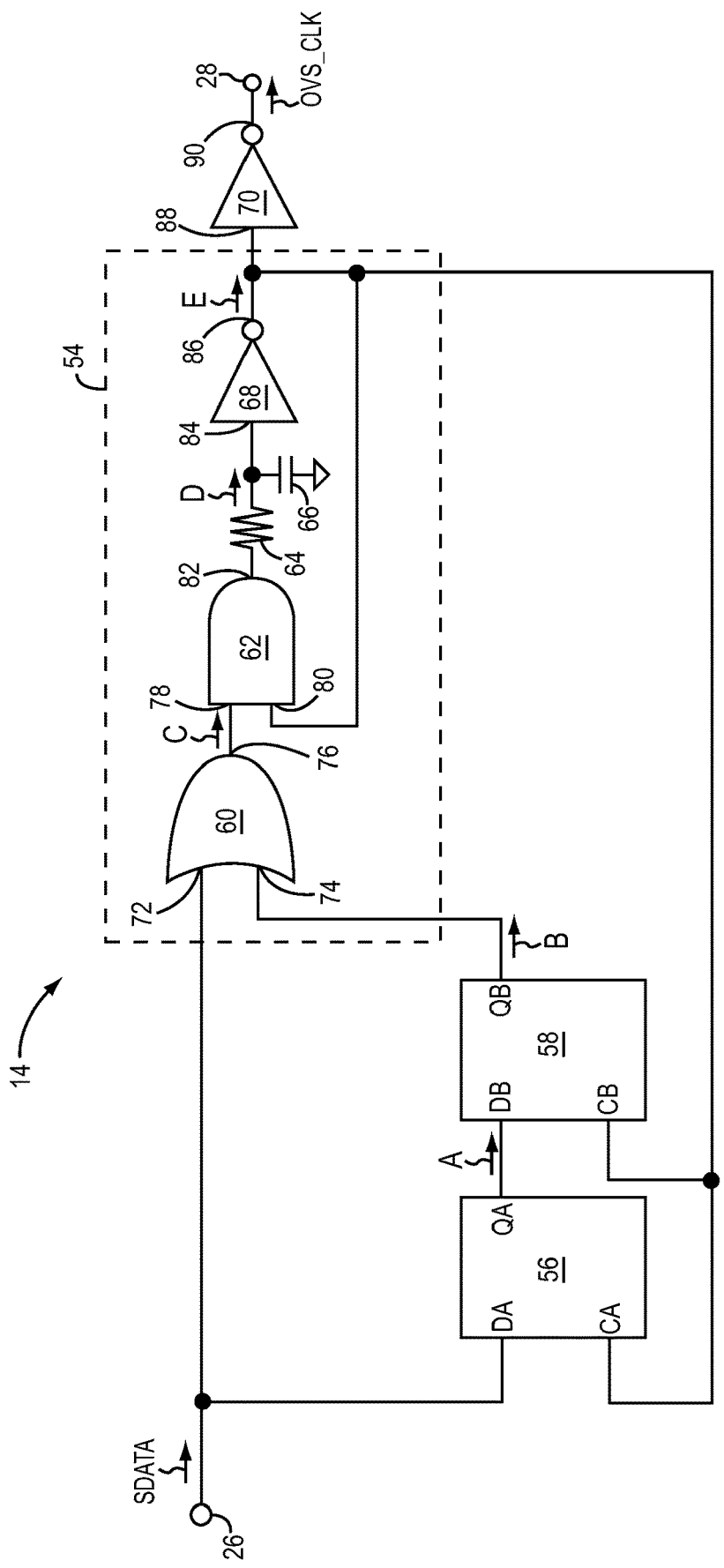
FIG. 3 illustrates one embodiment of an oscillator provided within the decoder shown in FIG. 1.

FIG. 3 illustrates one embodiment of the oscillator 14 provided within the decoder 10 shown in FIG. 1. The oscillator 14 includes a ring oscillator 54, a flip-flop 56, and a flip-flop 58. The ring oscillator 54 includes an OR gate 60, an AND gate 62, a resistor 64, a capacitor 66, and an inverter gate 68. An inverter gate 70 is connected to the inverter gate 68 of the ring oscillator 54. The input data signal SDATA is received at the enabling terminal 26. The oscillator 14 provides an asynchronous turn on and a synchronous turn off. An asynchronous turn on is acceptable because the normal state of this oscillator 14 is off. A synchronous turn off is used because data pulse edges on SDATA do not have a guaranteed phase.

The flip-flops 56, 58 are coupled sequentially with one another such that the flip-flops 56, 58 are configured to receive the input data signal SDATA and generate a delayed data signal B. More specifically, the flip-flop 56 includes a data terminal DA coupled to receive the data input signal SDATA, an output terminal QA, and a clock terminal CA. The flip-flop 58 includes a data terminal DB coupled to the output terminal QA, an output terminal QB, and a clock terminal CB. Flip-flop 56 generates a delayed data signal A from the data input signal SDATA, which is received by the flip-flop 58 at the data terminal DB. In response, the flip-flop 58 generates the delayed data signal B from the output terminal QB. In other embodiments, more flip-flops are provided in sequence with the flip-flops 56, 58 to provide an appropriate delay. The clock terminals CA, CB of the flip-flops 56, 58 are coupled to the ring oscillator 54 such that each of the flip-flops 56, 58 is clocked by the ring oscillator 54.

The OR gate 60 has an input terminal 72 coupled to receive the input data signal SDATA, an input terminal 74 coupled to the output terminal QB of the flip-flop 58, and an output terminal 76. The flip-flops 56, 58 are thus coupled to provide the delayed data signal B to the input terminal 74 of the OR gate 60. The OR gate 60 performs an OR operation on the input data signal SDATA and the delayed data signal B to generate an oscillator enable signal C at the output terminal 76.

The AND gate 62 has an input terminal 78 coupled to the output terminal 76 so as to receive the oscillator enable signal C, an input terminal 80 coupled to the ring oscillator 54, and an output terminal 82. The AND gate 62 thus gates the ring oscillator 54 and provides a feedback oscillator signal D from the output terminal 82. The resistor 64 and the capacitor 66 are used to provide a time constant for the ring oscillator 54. The feedback oscillator signal D is generated in accordance with the time constant set by the resistor 64 and capacitor 66 respectively. The inverter gate 68 has an input terminal 84 that receives the feedback oscillator signal D. The inverter gate 68 is an initial stage of the ring oscillator 54. The inverter gate 68 is configured to invert the feedback oscillator signal D and generate an intermediate oscillator signal E from an output terminal 86. The intermediate oscillator signal E is fed back to the input terminal 80 of the AND gate 62 and is provided to the clock terminals CA, CB to clock the flip-flops 56, 58. The AND gate 62 thus perform an AND operation on the intermediate oscillator signal E and the oscillator enable signal C to generate the feedback oscillator signal D. The intermediate oscillator signal E is provided to an input terminal 88 of the inverter gate 70. The inverter gate 70 is a buffer of the ring oscillator 54. The inverter gate 70 is configured to generate the oscillator signal OVS_CLK from an output terminal 90 of the inverter gate 70. The oscillator signal OVS_CLK is then output from the output terminal 28.

Figure 4:
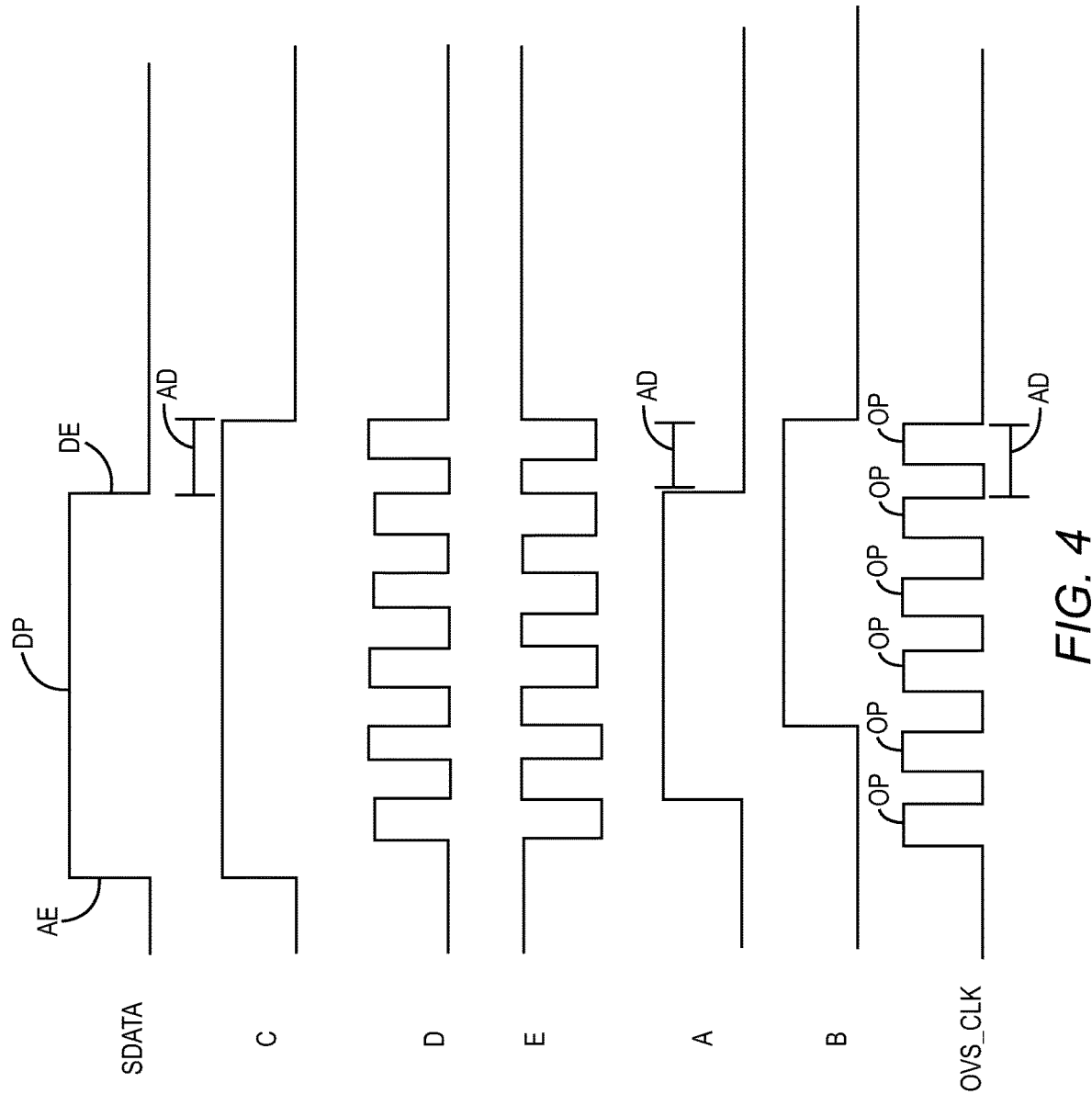
FIG. 4 illustrates an exemplary timing diagram for the oscillator shown in FIG. 3.

Referring now to FIG. 3 and FIG. 4, FIG. 4 illustrates an exemplary timing diagram for the oscillator 14 shown in FIG. 3. The operation of the oscillator 14 is demonstrated for the data pulse DP defined by the input data signal SDATA. Initially, when the input data signal SDATA is low, the capacitor 66 is discharged, and the feedback oscillator signal D is low while the intermediate oscillator signal E is high. At an activation edge AE of the data pulse DP and throughout the data pulse DP, the input terminal 72 of the OR gate 60 rises, and thus the oscillator enable signal C is provided in an activation state. Eventually the capacitor 66 charges enough so that the feedback oscillator signal D also is provided in an activation state. In response, the intermediate oscillator signal E goes low. As such, the capacitor 66 begins to discharge, and eventually the inverter gate 68 provides the intermediate oscillator signal E high. The inverter gate 70 then inverts the intermediate oscillator signal E to generate the oscillator signal OVS_CLK low. The process repeats so that, through the inverter gate 70, the ring oscillator 54 generates the oscillation pulses OP in the oscillation signal OVS_CLK. Note that any number of additional inverter gates may be provided in the ring oscillator 54 to provide an odd number of inversions.

By utilizing the OR gate 60, the input data signal SDATA provides a gated clock that activates and deactivates the ring oscillator 54. However, sampling errors can occur since the input data signal SDATA and the oscillator signal OVS- _CLK are not frequency locked. The flip-flops 56, 58 synchronize the input data signal SDATA in accordance with the oscillator signal OVS_CLK and ensure that the oscillator 14 is cleanly deactivated. If the oscillation pulses OP of the oscillator signal OVR_CLK were being provided by sampling the input data signal SDATA, there would be a potential for counter errors on the activation edge AE and the deactivation edge DE of the data pulse DP defined by of the input data signal SDATA. The flip-flops 56, 58 hold the oscillator enable signal C high for a time delay AD to ensure proper synchronization.

After the deactivation edge DE, the delayed data signal A is delayed by the flip-flop 56, and the delayed data signal B has an additional delay due to the flip-flop 58. This provides the oscillator enable signal C in a high state for an additional period AD after the deactivation edge DE. Otherwise, if the OR gate 60 were not provided and the input data signal SDATA were provided directly into the input terminal 78 of the AND gate 62, a narrow glitch could occur in the feedback oscillator signal D. Also, in a worst case scenario without the OR gate, the activation edge AE or the deactivation edge DE of the SDATA is provided during a positive edge of one of the oscillation pulses OP of the oscillator signal OVR_CLK. Since noise can shift the activation edge AE or the deactivation edge DE, this could cause a counter error. If both the activation edge AE and the deactivation edge DE shift, counter errors from 0-2 can result. The OR gate 60 and the flip-flops 56, 58 help ensure that the activation edge AE and the deactivation edge DE are appropriately aligned and that glitches do not occur in the oscillation signal OVR_CLK. In this manner, an appropriate number of the oscillation pulses OP are provided for the data pulse DP.

Figure 5:
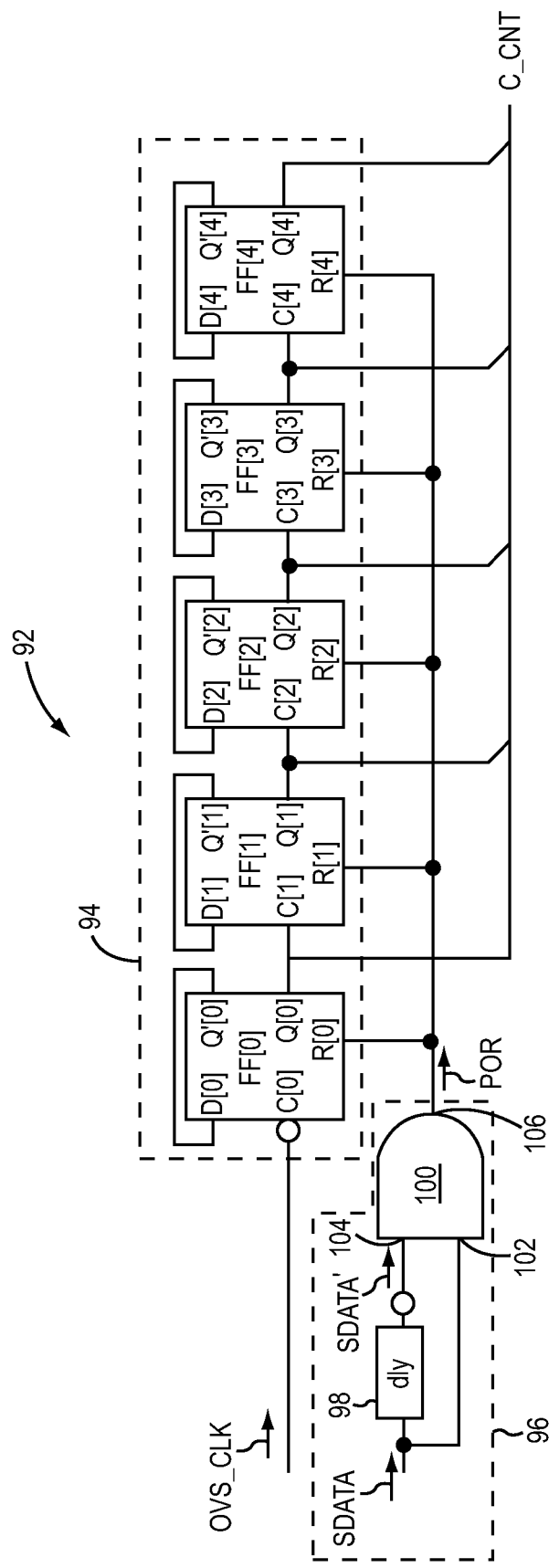
FIG. 5 illustrates one embodiment of a counter, which may be provided within the decoder shown in FIG. 1.

FIG. 5 illustrates one embodiment of a counter 92. The first counter 18 and/or the second counter 20 shown in FIG. 1 may be provided in accordance with the counter 92 shown in FIG. 5. The counter 92 includes a ripple counter 94 and a reset circuit 96. The ripple counter 94 includes flip-flops (referred to generally or generically as elements FF and specifically as elements FF[0]-FF[4]). Each of the flip-flops FF includes a data terminal (referred to generally or generically as elements D and specifically as elements D[0]-D[4]), a non-inverted output terminal (referred to generally or generically as elements Q and specifically as elements Q[0]-Q[4]), an inverted output terminal (referred to generally or generically as elements Q' and specifically as elements Q'[0]-Q'[4]), a clock terminal (referred to generally or generically as elements C and specifically as elements C[0]-C[4])), and a reset terminal (referred to generally or generically as elements R and specifically as elements R[0]-R[4])).

More specifically, a flip-flop FF[0] includes a data terminal D[0], a non-inverted output terminal Q[0], an inverted output terminal Q'[0], and a reset terminal R[0]. The inverted output terminal Q'[0] is connected to the data terminal D[0]. The reset terminal R[0] is coupled to the reset circuit 96. The clock terminal C[0] is connected to receive an inverted version of the oscillation signal OVS_CLK. A flip-flop FF[1] includes a data terminal D[1], a non-inverted output terminal Q[1], an inverted output terminal Q'[1], and a reset terminal R[1]. The inverted output terminal Q'[1] is connected to the data terminal D[1]. The reset terminal R[1] is coupled to the reset circuit 96. The clock terminal C[1] is connected to the non-inverted output terminal Q[0]. A flip-flop FF[2] includes a data terminal D[2], a non-inverted output terminal Q[2], an inverted output terminal Q'[2], and a reset terminal R[2]. The inverted output terminal Q'[2] is connected to the data terminal D[2]. The reset terminal R[2] is coupled to the reset circuit 96. The clock terminal C[2] is connected to the non-inverted output terminal Q[1]. A flip-flop FF[3] includes a data terminal D[3], a non-inverted output terminal Q[3], an inverted output terminal Q'[3], and a reset terminal R[3]. The inverted output terminal Q'[3] is connected to the data terminal D[3]. The reset terminal R[3] is coupled to the reset circuit 96. The clock terminal C[3] is connected to the non-inverted output terminal Q[2]. Finally, a flip-flop FF[4] includes a data terminal D[4], a non-inverted output terminal Q[4], an inverted output terminal Q'[4], and a reset terminal R[4]. The inverted output terminal Q'[4] is connected to the data terminal D[4]. The reset terminal R[4] is coupled to the reset circuit 96. The clock terminal C[4] is connected to the non-inverted output terminal Q[3]. Each of the flip-flops FF stores a bit of a count parameter C_CNT, which may be the reference parameter SYNC_CNT or the first count parameter BIT_CNT. The ripple counter arrangement of the flip-flops FF allows for the count parameter C_CNT to be incremented for each the oscillation pulses defined by the oscillation signal OVR_CLK.

The reset circuit 96 is configured to generate a reset signal POR that is received by the reset terminal R of each of the flip-flops FF to reset the ripple counter 94. In particular, the reset circuit 96 provides power on reset. As shown in FIG. 5, the reset circuit 96 includes a delay element 98 and an AND gate 100. The AND gate 100 has an input terminal 102 operable to receive the input data signal SDATA. The input data signal SDATA is also received by the delay element 98 that provides a delayed data signal SDATA', which is a delayed and inverted version of the input data signal SDATA. The AND gate 100 is operable to receive the delayed data signal SDATA' at the input terminal 104. The AND gate 100 also includes an output terminal 106. The AND gate 100 is configured to perform an AND operation on the input data signal SDATA and the delayed data signal SDATA' to generate the reset signal POR. Thus, the reset signal POR is high only after the reset circuit 96 is initially turned on by an activation edge of a data pulse and for a temporal period equal approximately to a propagation delay of the delay element 98. Otherwise, the reset signal POR remains low. The propagation delay of the delay element 98 is shorter than an oscillation period of the oscillation pulses defined by the oscillation signal OVS_CLK. This is because the negative edge of the oscillation pulses defined by the oscillation signal OVS_CLK is used. Once the input data signal SDATA goes low, the oscillation signal OVS_CLK is provided in a deactivation state, so the counter 92 will hold its last value of the count parameter C_CNT.

Figure 6:
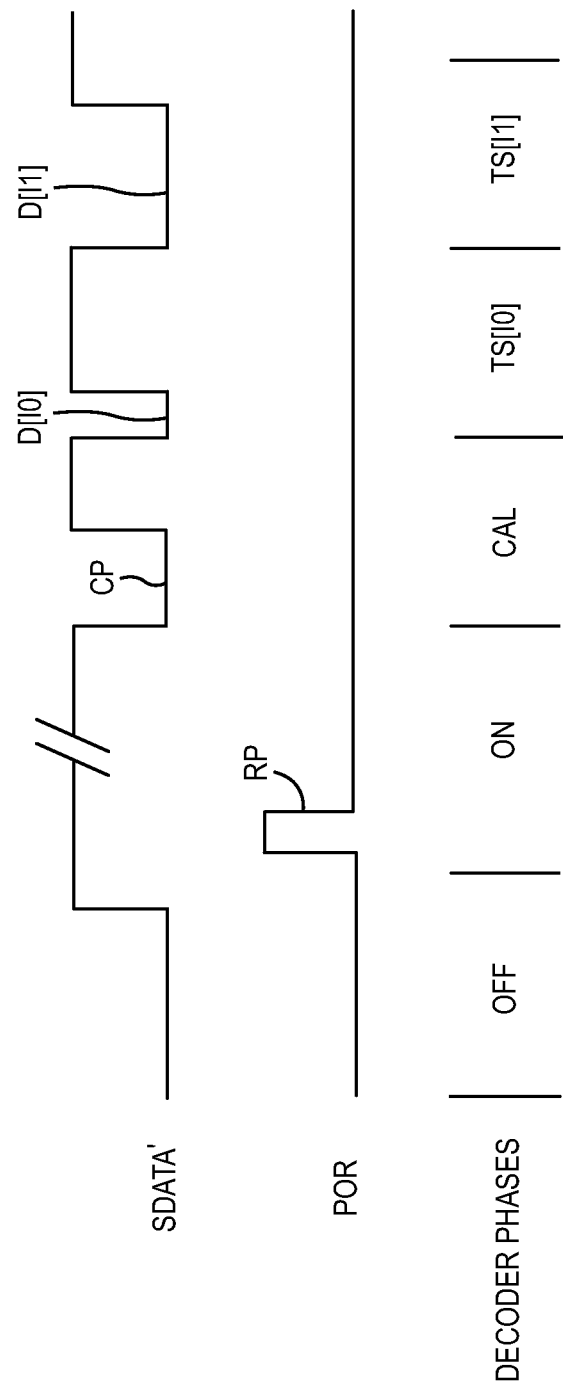
FIG. 6 illustrates a timing diagram for the counter shown in FIG. 5.

FIG. 6 illustrates a timing diagram for the counter 92 shown in FIG. 5. In this embodiment, the delayed input data signal SDATA' is shown, which is inverted with respect to the input data signal SDATA. The reset signal POR is shown for different phases of the decoder 10, including an off state, an on state, a calibration time slot CAL that provides a calibration pulse CP, a data pulse D[I0] that represents a bit value of 0 during a time slot TS[I0], and a data pulse D[I1] that represents a bit value of 1 during a time slot TS[I1]. As shown in FIG. 6, the reset signal POR has a reset pulse RP, which is provided initially when transitioning from the off state and the on state.

As illustrated by the timing diagram in FIG. 6, the counter 92 shown in FIG. 5 uses active high signaling. Note that since the signaling polarity is inverted in the delayed data signal SDATA', the oscillation signal OVS_CLK shown in FIG. 5 triggers the counter 92 when delayed data signal SDATA' is low. With reference to FIG. 6, the oscillation signal OVS_CLK will not be provided when the decoder 10 is in the off state or in the on state. It will only run during the calibration time slot CAL, the time slot TS[I0] and the time slot [I1].

As shown by the delayed data signal SDATA', when the input data signal SDATA pin is held low for a long period of time during the off state, it essentially starves the decoder 10 of power and the decoder turns off. To wake up the slave in the on state, the data input signal SDATA and the delayed input signal SDATA simply go high. This allows for the decoder 10 to be turned on in the on state and triggers the reset pulse RP of the reset signal POR when reaching a nominal voltage threshold. From there, the delayed data signal SDATA' has an opposite polarity of the data input signal SDATA shown in FIG. 2.

Figure 7:
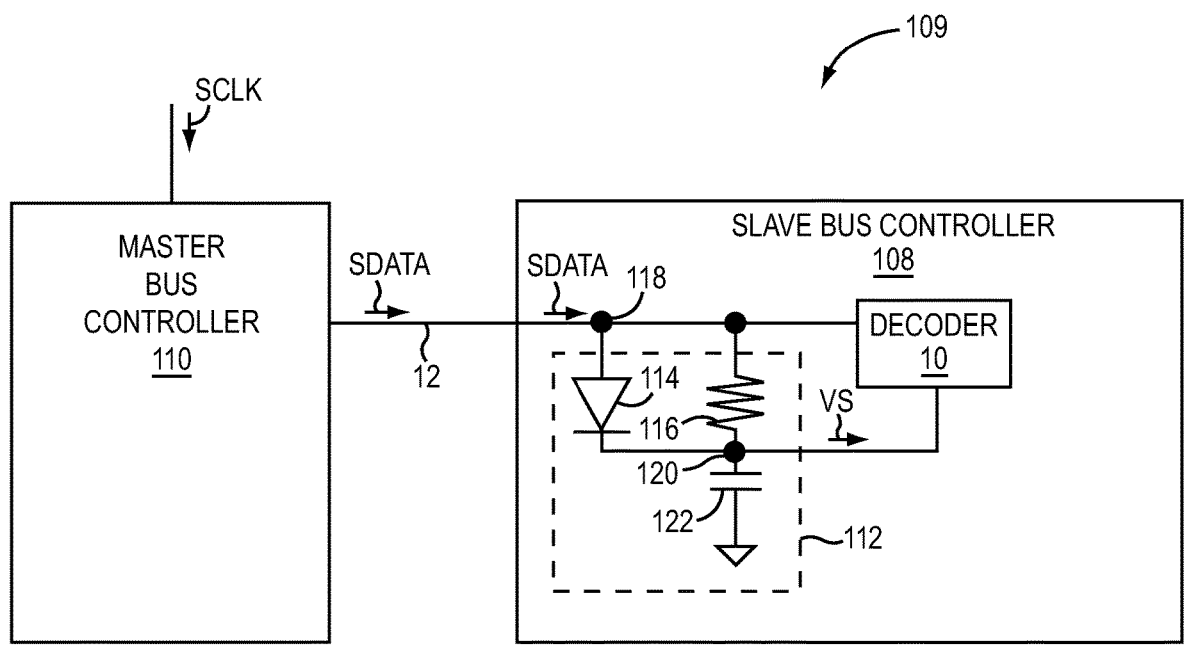
FIG. 7 illustrates an exemplary bus interface system having a slave bus controller, a master bus controller, and a bus line, where the slave bus controller derives power from the input data signal transmitted along the bus line.

FIG. 7 illustrates an exemplary bus interface system 109 having a slave bus controller 108, a master bus controller 110, and the bus line 12, where the slave bus controller 108 derives power from the input data signal SDATA. The master bus controller 110 is configured to generate the input data signal SDATA in accordance with the PWM bus protocol described above. The master bus controller 110 is coupled to the bus line 12 to transmit the input data signal SDATA along the bus line 12 to the slave bus controller 108. The slave bus controller 108 includes the decoder 10 described above with respect to FIG. 1. The slave bus controller 108 is also coupled to the bus line 12 to receive the input data signal SDATA from the master bus controller 110. In this manner, the slave bus controller 108 can recover bits from the input data signal SDATA using the decoder 10 as described above with respect to FIGS. 1 and 2. The slave bus controller 108 also includes power conversion circuitry 112 configured to also receive the input data signal SDATA and convert the input data signal SDATA into a supply voltage VS. More specifically, the supply voltage VS is used to power the decoder 10 in the slave bus controller 108 along with other components. Note that in this embodiment of the bus interface system 109, no other bus line is provided to couple the master bus controller 110 to the slave bus controller 108. Thus, only the bus line 12 is provided to couple the master bus controller 110 to the slave bus controller 108.

While the master bus controller 110 may use the system clock signal SCLK to synchronize the input data signal SDATA, the system clock signal SCLK does not have to be provided to the slave bus controller 108 since the master bus controller 110 generates the input data signal SDATA in accordance with the PWM bus protocol. As a result, the calibration pulse of the data frame is used by the decoder 10 in the slave bus controller 108 to synchronize the data frames and provide calibration as explained with respect to FIGS. 1 and 2 above. Thus, a clock bus line does not have to be provided between the master bus controller 110 and the slave bus controller 108 since the slave bus controller 108 can be synchronized without the system clock signal SCLK. Furthermore, since the power conversion circuitry 112 converts the input data signal SDATA into the supply voltage VS, a power bus line does not have to be provided in order to provide a supply voltage to the slave bus controller 108. Instead, the slave bus controller 108 generates the supply voltage VS from the input data signal SDATA itself. Thus, no other bus line besides the bus line 12 is provided by the bus interface system 109 to couple the master bus controller 110 to the slave bus controller 108.

In this embodiment, the power conversion circuitry 112 includes a diode 114 and a resistor 116 coupled in parallel between a node 118 and a node 120. Both the diode 114 and the resistor 116 receive the input data signal SDATA from the node 118. A capacitor 122 is coupled in shunt to the node 120. The capacitor 122 is charged by the input data signal SDATA to generate the supply voltage VS.

The power conversion circuitry 112 isolates the bus line 12 from the supply voltage VS provided to power the slave bus controller 108. The diode 114 allows for the input data signal SDATA to be pulled low without discharging the supply voltage VS. The resistor 116 does cause a slight pull down of the supply voltage VS. The diode 114 allows for faster charging of the capacitor 122. When the master bus controller 110 pulls the input data signal SDATA low to turn off the slave bus controller 108, the resistor 116 discharges the capacitor 122 to turn off the supply voltage VS and the slave bus controller 108.

Figure 8:
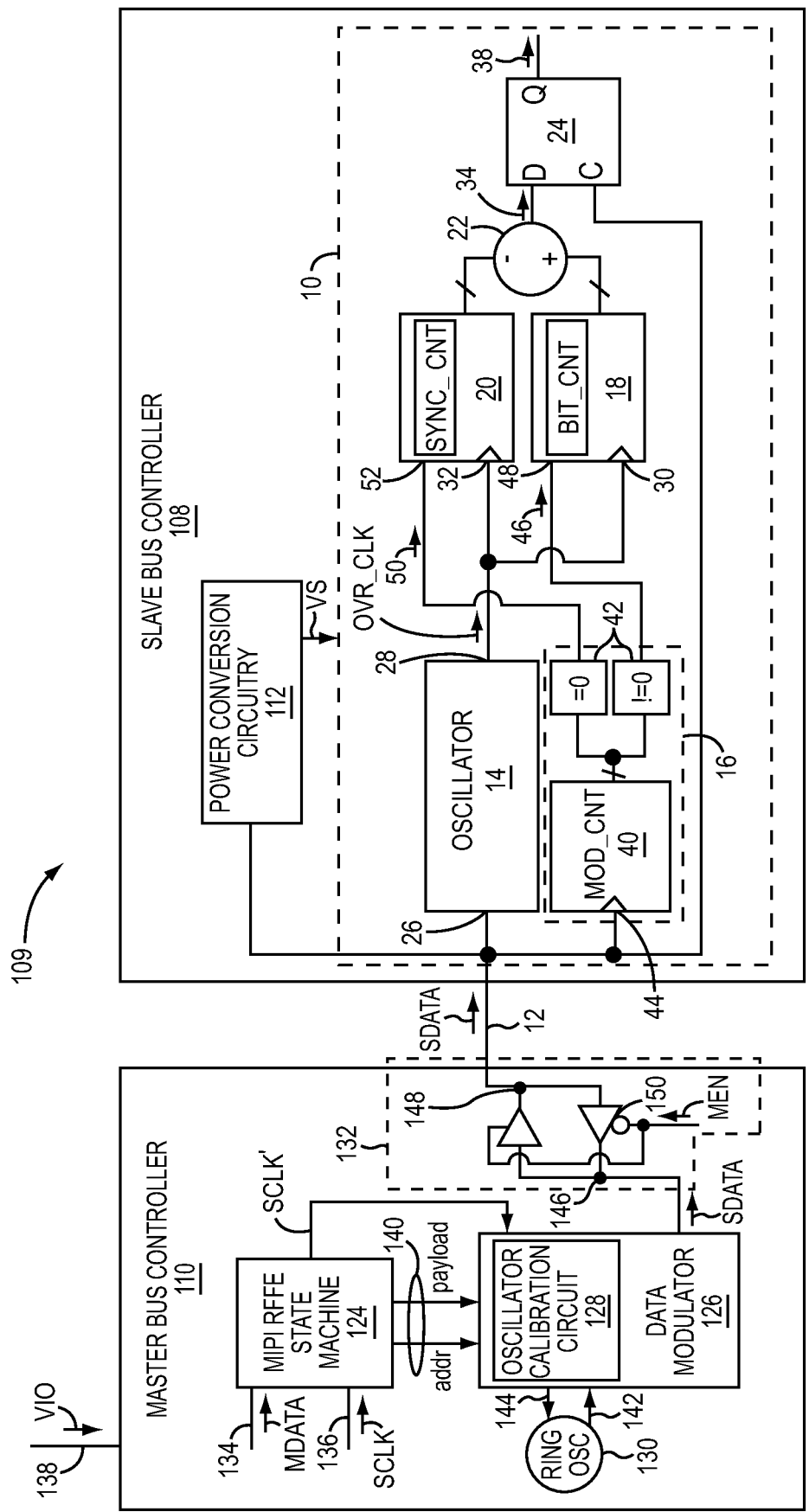
FIG. 8 illustrates another exemplary embodiment of the bus interface system that includes exemplary embodiments of the slave bus controller and the master bus controller, where the master bus controller is a bridge bus controller.

FIG. 8 illustrates another exemplary embodiment of the bus interface system 109 that includes exemplary embodiments of the slave bus controller 108 and the master bus controller 110. The master bus controller 110 is coupled to the bus line 12 to provide the input data signal SDATA and transmit the input data signal SDATA along the bus line 12 to the slave bus controller 108. The slave bus controller 108 includes the decoder 10 described above with respect to FIG. 1 and the power conversion circuitry 112 described above with respect to FIG. 7 that generates the supply voltage VS that powers the decoder 10. The slave bus controller 108 is also coupled to the bus line 12 to receive the input data signal SDATA from the master bus controller 110. In this embodiment, the master bus controller 110 is a bridge bus controller that translates a data frame formatted in accordance with a first bus protocol into the data pulses DP (shown in FIG. 2) defined by the input data signal SDATA during the time slots TS (shown in FIG. 2) of the data frame formatted in accordance with the PWM bus protocol. More specifically, in this embodiment, the master bus controller 110 is configured to translate the payload and the bus address represented by a data frame formatted in accordance with a Mobile Industry Processor Interface (MIPI) bus protocol and translate the payload and the bus address represented by the second data frame into the data pulses DP (shown in FIG. 2) defined by the input data signal SDATA during the time slots TS (shown in FIG. 2) of the data frame formatted in accordance with the PWM bus protocol.

The master bus controller 110 shown in FIG. 8 includes a MIPI Radio Frequency Front End (RFFE) state machine 124, a data modulator 126, an oscillator calibration circuit 128, a ring oscillator 130, and a bidirectional buffer 132. In this embodiment, the oscillator calibration circuit 128 is provided in the data modulator 126. The MIPI RFFE state machine 124 is configured to receive a first bus input, which in this example is a data input signal MDATA formatted in accordance with the MIPI bus protocol. The data input signal MDATA is received on a bus line 134. The data input signal MDATA represents a data frame that includes a bus address and a payload formatted in accordance with the MIPI bus protocol. To synchronize the master bus controller 110, the master bus controller 110 also receives the system clock signal SCLK on a bus line 136. Furthermore, the master bus controller 110 receives a supply voltage VIO along a bus line 138. The MIPI RFFE state machine is configured to extract the bus address and the payload from the data frame represented using the input data signal MDATA and generate a digital output 140 that transfers the bus address and the payload to the data modulator 126. The data modulator 126 is configured to obtain the bus address and payload extracted from the data input signal MDATA and provide the bus address and payload to a data frame formatted in accordance with the PWM bus protocol. The data modulator 126 is synchronized using the ring oscillator 130, which in this example is a digitally controlled oscillator (DCO). The ring oscillator 130 is configured to generate an oscillator signal 142. The ring oscillator 130 is relatively cheap. The oscillator calibration circuit is configured to calibrate the ring oscillator 130 based on the system clock signal SCLK. In this embodiment, the MIPI RFFE state machine 124 is configured to generate a calibration clock signal SCLK' by dividing down the system clock signal SCLK. The oscillator calibration circuit 128 is operable to receive the calibration clock signal SCLK' and generate a control output 144 that synchronizes the oscillator signal 142 in accordance with the calibration clock signal SCLK'.

The data modulator 126 is operable to receive the oscillator signal 142 and is configured to generate the input data signal SDATA such that the data pulses DP (shown in FIG. 2) of the input data signal SDATA are synchronized by the oscillator signal 142. Since the oscillator signal 142 was synchronized based on the system clock signal SCLK (e.g., in this embodiment, in accordance with the calibration clock signal SCLK' generated from the system clock signal SCLK), the timing accuracy of the oscillator signal 142 is maintained. As shown in FIG. 8, the bidirectional buffer 132 has an input terminal 146 that receives the SDATA signal and an output terminal 148 that provides the input data signal SDATA to the bus line 12. The output terminal 148 is coupled to the bus line 12, which is connected to the slave bus controller 108. However, the bidirectional buffer 132 also includes an input terminal 150 that is operable to receive an enable signal MEN. When the enable signal MEN is in an activated state, the bidirectional buffer 132 is configured to transmit the input data signal SDATA along the bus line 12. Otherwise, when the enable signal MEN is in a deactivation state, the bidirectional buffer 132 does not transmit the input data signal SDATA along the bus line 12 but rather allows the master bus controller 110 to receive data signals from slave controllers connected to the bus line 12. The enabling signal MEN may be generated by the data modulator 126 and may activate the bidirectional buffer 132 when the slave bus controller 108 (shown in FIG. 7) is not pulling down the bus line 12. Since the slave bus controller 108 is synchronized with the data pulse DP[0] (i.e., the calibration pulse), and the power conversion circuitry 112 converts the input data signal SDATA into the supply voltage VS, the master bus controller 110 and the slave bus controller 108 are only connected by the bus line 12. No other bus lines are needed.

Figure 9:
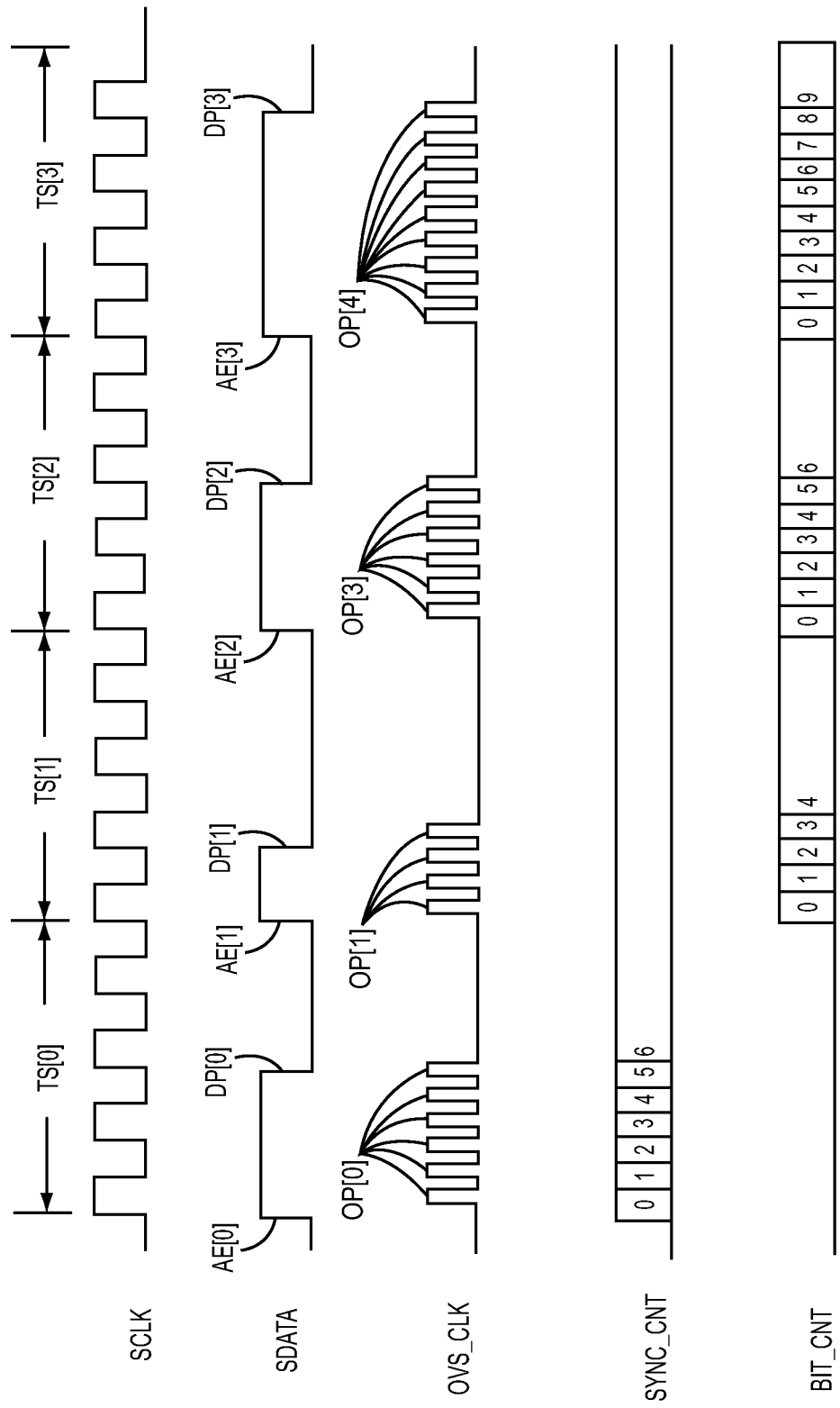
FIG. 9 illustrates a timing diagram for the bus interface system shown in FIG. 8 during an exemplary data frame provided in accordance to a one wire PWM bus protocol.

Referring now to FIG. 8 and FIG. 9, FIG. 9 illustrates a timing diagram for the bus interface system 109 shown in FIG. 8 during an exemplary data frame provided in accordance to another one wire PWM bus protocol. FIG. 9 includes an exemplary illustration of the input data signal SDATA, the system clock signal SCLK, the oscillation signal OVS_CLK, the reference parameter SYNC_CNT, and the first count parameter BIT_CNT as provided throughout the data frame. In this embodiment, the PWM bus protocol is provided so that the data pulses DP[1]-DP[3] represents any one of a set of logical values. More specifically, the data pulses DP[1]-DP[3] can represent any one of a set of three logical symbols, such as a logical symbol "0," a logical symbol "1," and a logical symbol "2." The master bus controller 110 is configured to generate the input data signal SDATA, which is synchronized based on the system clock signal SCLK, as described above. Again, in this embodiment, the data pulse DP[0] is the calibration pulse provided during the time slot TS[0], which is the calibration time slot. In this example, the data pulse DP[0] is provided by the master bus controller 110 for two clock periods of the system clock signal SCLK. The master bus controller 110 generates the data pulses DP[1]-DP[3] with logical symbols representing a bus address and a payload using the ring oscillator 130, as explained above with respect to FIG. 8.

With respect to the slave bus controller 108, the oscillator 14 in the decoder 10 is configured to be enabled by the data pulse DP[0], which is the calibration pulse provided during the calibration time slot (i.e., TS[0]). The second counter 20 may be configured to reset the reference parameter SYNC_CNT to an initial value of zero (0) in response to an activation edge AE[0] of the data pulse DP[0]. The second counter 20 is configured to count the oscillation pulses OP[0] defined by the oscillation signal OVR_CLK during the time slot TS[0] as a result of the data pulse DP[0] (the calibration pulse). More specifically, the second counter 20 is configured to increment the reference parameter SYNC_CNT as a result of each of the oscillation pulses OP[0] defined by the oscillation signal OVR_CLK during the time slot TS[0]. In this example, the reference parameter SYNC_CNT is set equal to a reference number of six (6) as a result of the six oscillation pulses OP[0] generated as a result of the data pulse DP[0] during the time slot TS[0]. As a result of the end of the data pulse DP[0], no more of the oscillation pulses OP[0] are generated, and the oscillation signal OVS_CLK is held in a deactive state for a remainder of the time slot TS[0]. Accordingly, the reference parameter SYNC_CNT indicates the reference number of six (6), which is how many of the oscillation pulses OP[0] were generated by the oscillator 14 during the time slot TS[0] (i.e., the calibration time slot) as a result of the data pulse DP[0] (i.e., the calibration pulse).

With respect to the second time slot TS[1], the counter enabling circuitry 16 is configured to enable the first counter 18 and disable the second counter 20. As such, the second counter 20 holds the reference parameter SYNC_CNT at the reference number of six (6). The oscillator 14 is configured to be enabled by the data pulse DP[1]. The first counter 18 may be configured to reset the first count parameter BIT_CNT to an initial value of zero (0) in response to an activation edge AE[1] of the data pulse DP[1]. The first counter 18 is configured to count the oscillation pulses OP[1] defined by the oscillation signal OVR_CLK during the time slot TS[1] as a result of the data pulse DP[1], which has a 25% duty cycle.

More specifically, the first counter 18 is configured to increment the first count parameter BIT_CNT as a result of each of the oscillation pulses OP[1] defined by the oscillation signal OVR_CLK during the time slot TS[1]. In this example, the first count parameter BIT_CNT is set equal to a number of four (4) as a result of the four oscillation pulses OP[1] generated as a result of the data pulse DP[1] during the time slot TS[1]. As a result of the end of the data pulse DP[1], no more of the oscillation pulses OP[1] are generated and the oscillation signal OVS_CLK is held in a deactive state for a remainder of the time slot TS[1]. Accordingly, the first count parameter BIT_CNT indicates a number of four (4), which is how many of the oscillation pulses OP[1] were generated by the oscillator 14 during the time slot TS[1] as a result of the data pulse DP[1]. The comparison circuit 22 then subtracts the reference parameter SYNC_CNT from the first count parameter BIT_CNT. Since four (4) minus six (6) is negative, the comparison circuit 22 generates the data output 34 so that the data output 34 represents a logical symbol "0."

With respect to the time slot TS[2], the counter enabling circuitry 16 is configured to enable the first counter 18 and disable the second counter 20. As such, the second counter 20 holds the reference parameter SYNC_CNT at the reference number of six (6). The oscillator 14 is configured to be enabled by the data pulse DP[2]. The first counter 18 may be configured to reset the first count parameter BIT_CNT to an initial value of zero (0) in response to an activation edge AE[2] of the data pulse DP[2]. The first counter 18 is configured to count the oscillation pulses OP[2] defined by the oscillation signal OVR_CLK during the time slot TS[2] as a result of the data pulse DP[2], which has a 50% duty cycle.

More specifically, the first counter 18 is configured to increment the first count parameter BIT_CNT as a result of each of the oscillation pulses OP[2] defined by the oscillation signal OVR_CLK during the time slot TS[2]. In this example, the first count parameter BIT_CNT is set equal to a number of six (6) as a result of the six oscillation pulses OP[2] generated as a result of the data pulse DP[2] during the time slot TS[2]. As a result of the end of the data pulse DP[2], no more of the oscillation pulses OP[2] are generated, and the oscillation signal OVS_CLK is held in a deactive state for a remainder of the time slot TS[2]. Accordingly, the first count parameter BIT_CNT indicates a number of six (6), which is how many of the oscillation pulses OP[2] were generated by the oscillator 14 during the time slot TS[2] (i.e., the first address time slot) as a result of the data pulse DP[2]. The comparison circuit 22 then subtracts the reference parameter SYNC_CNT from the first count parameter BIT_CNT. Since six (6) minus six (6) is zero, the comparison circuit 22 generates the data output 34 so that the data output 34 represents a logical symbol of "1."

With respect to the time slot TS[3], the counter enabling circuitry 16 is configured to enable the first counter 18 and disable the second counter 20. As such, the second counter 20 holds the reference parameter SYNC_CNT at the reference number of six (6). The oscillator 14 is configured to be enabled by the data pulse DP[3]. The first counter 18 may be configured to reset the first count parameter BIT_CNT to an initial value of zero (0) in response to an activation edge AE[3] of the data pulse DP[3]. The first counter 18 is configured to count the oscillation pulses OP[3] defined by the oscillation signal OVR_CLK during the time slot TS[3] as a result of the data pulse DP[3] which has a 75% duty cycle.

More specifically, the first counter 18 is configured to increment the first count parameter BIT_CNT as a result of each of the oscillation pulses OP[3] defined by the oscillation signal OVR_CLK during the time slot TS[3]. In this example, the first count parameter BIT_CNT is set equal to a number of nine (9) as a result of the nine oscillation pulses OP[3] generated as a result of the data pulse DP[3] during the time slot TS[3]. As a result of the end of the data pulse DP[3], no more of the oscillation pulses OP[3] are generated, and the oscillation signal OVS_CLK is held in a deactive state for a remainder of the time slot TS[3]. Accordingly, the first count parameter BIT_CNT indicates a number of nine (9), which is how many of the oscillation pulses OP[3] were generated by the oscillator 14 during the time slot TS[3] as a result of the data pulse DP[3]. The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a logical symbol of "2."

Figure 10:
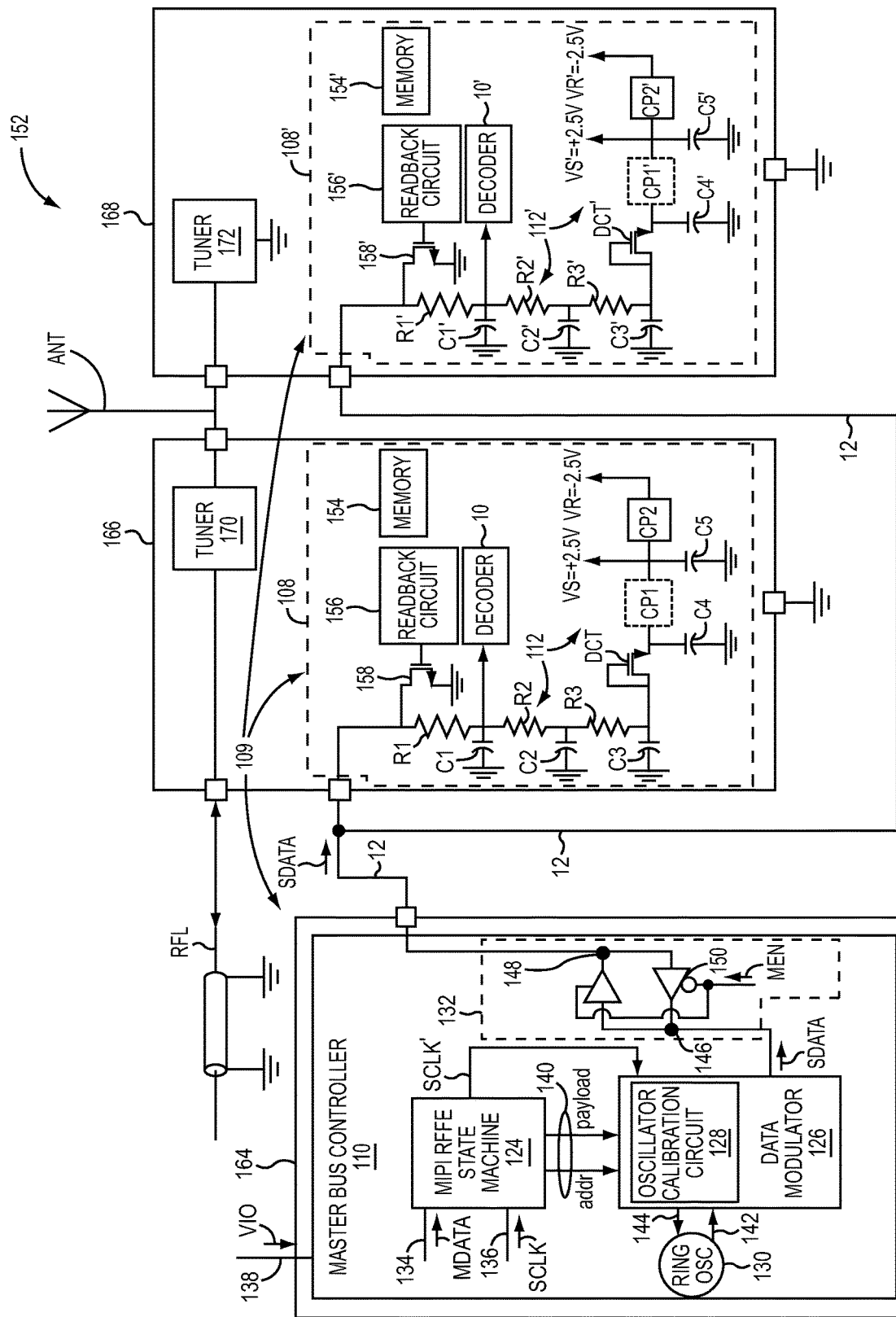
FIG. 10 illustrates another exemplary embodiment of the bus interface system that includes a master bus controller and slave bus controllers coupled in a daisy chain along the bus line.

FIG. 10 illustrates another exemplary embodiment of the bus interface system 109, which is provided in a radio frequency (RF) front end module 152. The bus interface system 109 includes an embodiment of the master bus controller 110, an embodiment of the slave bus controller 108, and another slave bus controller 108'. The slave bus controller 108' is coupled to the bus line 12 such that the slave bus controller 108 and the slave bus controller 108' are coupled in a daisy chain along the bus line 12. In this manner, the slave bus controller 108' also receives the input data signal SDATA from the master bus controller 110. In this embodiment, the slave bus controller 108 includes a memory device 154 that stores information received on the bus line 12 and can be used to write information on the bus line 12. A readback circuit 156 is configured to control a pull down transistor 158 in order to write bits onto the bus line 12. The slave bus controller 108 includes the decoder 10, which was described with respect to FIG. 1.

In addition, the slave bus controller 108 also includes another embodiment of the power conversion circuitry 112. In this embodiment, the power conversion circuitry includes shunt coupled capacitors C1, C2, C3, C4, C5, series connected resistors R1, R2, R3, a diode connected transistor DCT, a charge pump CP1, and a charge pump CP2. The shunt coupled capacitors C1, C2, C3, C4, C5, series connected resistors R1, R2, R3, and series connected transistors provide the appropriate RC constant to convert the input data signal SDATA into the supply voltage VS and a supply voltage VR. In this embodiment, the charge pump CP1 is a positive charge pump that generates the supply voltage at approximately +2.5V. The charge pump CP2 is a negative charge pump that generates the supply voltage VR at approximately −2.5V. The supply voltage VS and the supply voltage VR are provided to power the decoder 10 and readback circuit 156 of the slave bus controller 108.

In this embodiment, the slave bus controller 108' is identical to the slave bus controller 108. Thus, a decoder 10', a memory device 154', a readback circuit 156' a pull down transistor 158', a power conversion circuitry 112', shunt coupled capacitors C1', C2', C3', C4', C5', series connected resistors R1', R2', R3', a diode connected transistor DCT', a charge pump CP1', and a charge pump CP2' of the slave bus controller 108' are identical to the decoder 10, the memory device 154, the readback circuit 156, the pull down transistor 158, the power conversion circuitry 112, the shunt coupled capacitors C1, C2, C3, C4, C5, the series connected resistors R1, R2, R3, the diode connected transistor DCT, the charge pump CP1, and the charge pump CP2, respectively of the slave bus controller 108.

The master bus controller 110 is formed as an integrated circuit (IC) within an IC package 164. Similarly, the slave bus controller 108 is formed as an IC within an IC package 166 and the slave bus controller 108' is formed as an IC with an IC package 168. The IC packages 164, 166, 168 connect the master bus controller 110 and the slave bus controller 108, 108' in a daisy chain along the bus line 12. This arrangement thus reduces interconnections, and thus the slave bus controllers 108, 108' are provided with other circuitry of the RF front end module. More specifically, the IC package 166 includes a tuner 170 connected to an antenna ANT along an RF line RFL. The IC package 168 also includes a tuner 172 connected to the antenna ANT along the RF line RFL. In this example, the master bus controller 110 may be included within a cellular baseband chipset in a dedicated phone compartment and the slave bus controllers 108, 108' reside close to the antenna ANT. Reducing interconnections helps reduce costs and increase reliability.

Figure 11:
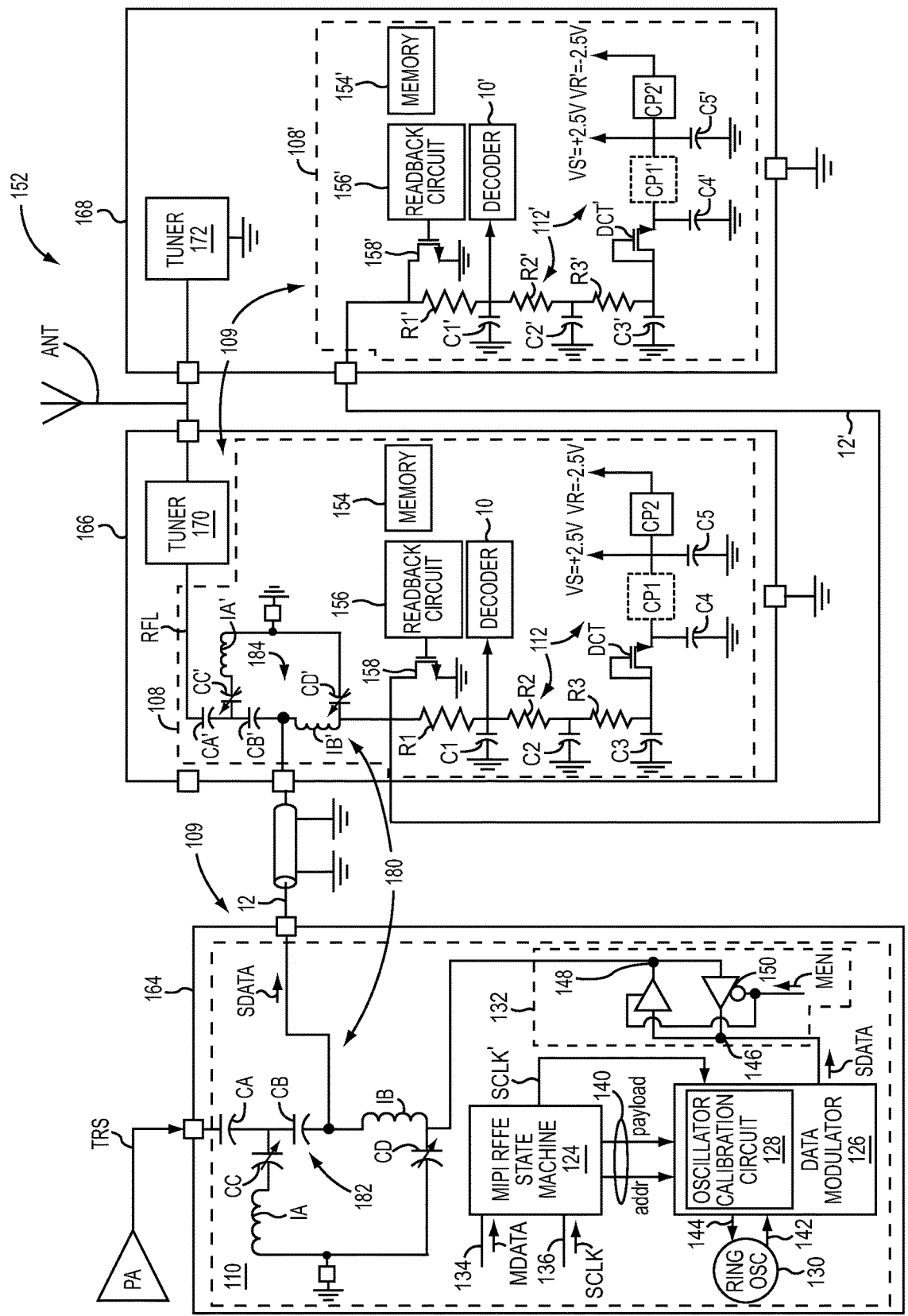
FIG. 11 illustrates another exemplary embodiment of the bus interface system that includes a master bus controller and slave bus controllers with a diplexer that reduces transmit injections along the bus line.

FIG. 11 illustrates another exemplary embodiment of the bus interface system 109, which is provided in another embodiment of the RF front end module 152. The master bus controller 110, the slave bus controller 108, and the slave bus controller 108' are the same as the embodiments shown in FIG. 10 except that, in this embodiment, the slave bus controller 108 and the slave bus controller 108' are connected by a bus line 12'. Furthermore, a diplexer 180 is provided to deal with transmit injection onto the bus line 12 and the bus line 12' resulting from a transmit signal TRS amplified by the power amplifier PA in the RF front end module 152. The RF transmit signal TRS propagates along the RF line RFL. The diplexer 180 includes a first RF filter 182 and a second RF filter 184. The master bus controller 110 includes the first RF filter 182. The slave bus controller 108 includes the second RF filter 184.

The RF transmit signal TRS is diplexed onto the wire in the master bus controller 110 and to the wire in the slave bus controller 108. As such, the RF transmit signal TRS needs to be passed with as little loss and noise as possible. The first RF filter 182 and the second RF filter 184 are configured to block bus noise produced by the master bus controller 110, the slave bus controller 108, and the slave bus controller 108' from entering the RF line RFL and the RF transmit signal TRS. The bus line 12 is connected between the first RF filter 182 and the second RF filter 184. The bus line 12' is connected between the pull down transistor 158 and resistor R1 in the slave bus controller 108 and is connected between the pull down transistor 158' and resistor R1' in the slave bus controller 108'.

The first RF filter 182 includes capacitors CA, CB, variable capacitive structure CC, CD, inductor IA, and inductor IB. The capacitor CA is coupled in series to provide matching for the transmit signal TRS from the power amplifier PA. The variable capacitive structure CC and the inductor IA are series coupled to form a series resonator connected in shunt. The capacitor CB, variable capacitive structure CC, and the inductor IA form a high pass filter that blocks energy from the communications bus activity from getting back to RF sections. The variable capacitive structure CD and the inductor IB are coupled in series to form another series resonator. The variable capacitive structure CD and the inductor IB form a low pass filter that blocks RF energy from getting to the data modulator 126. This low pass filter reduces RF levels at the output terminal 148 of the bidirectional buffer 132 from entering the master bus controller 110. The variable capacitive structures CC and CD may each be a programmable array of capacitors. Any other suitable variable capacitive structure may also be used such as varactors. In this manner, the first RF filter 182 can be tuned.

The second RF filter 184 includes capacitors CA', CB', variable capacitive structure CC', CD', inductor IA', and inductor IB'. The bus line 12 is connected to first RF filter 182 between the capacitor CB and the inductor IB and is connected to the second RF filter 184 between the capacitor CB' and the inductor IB'. The capacitor CA' is coupled in series to provide matching to the RF line RFL. The variable capacitive structure CC' and the inductor IA' are series coupled to form a series resonator connected in shunt. The capacitor CB', variable capacitive structure CC', and the inductor IA' form a high pass filter that blocks energy from the communications bus activity from getting back to RF sections. The variable capacitive structure CD' and the inductor IB' are coupled in series to form another series resonator. The series resonator formed by the variable capacitive structure CD' and the inductor IB' are connected in series to the other components of the slave bus controller 108. The variable capacitive structure CD' and the inductor IB' form a low pass filter that blocks RF energy from getting to the slave bus controller 108 and the slave bus controller 108' through the bus line 12'. The variable capacitive structures CC' and CD' may each be a programmable array of capacitors. Any other suitable variable capacitive structure may also be used such as varactors. In this manner, the second RF filter 184 can be tuned. The diplexer 180 may be tuned to have an elliptical response (Cauer characteristic response) such that the first RF filter 182 and the second RF filter 184 can be tuned for optimal selectivity at a signal frequency of the RF transit signal TRS.

Figure 12:
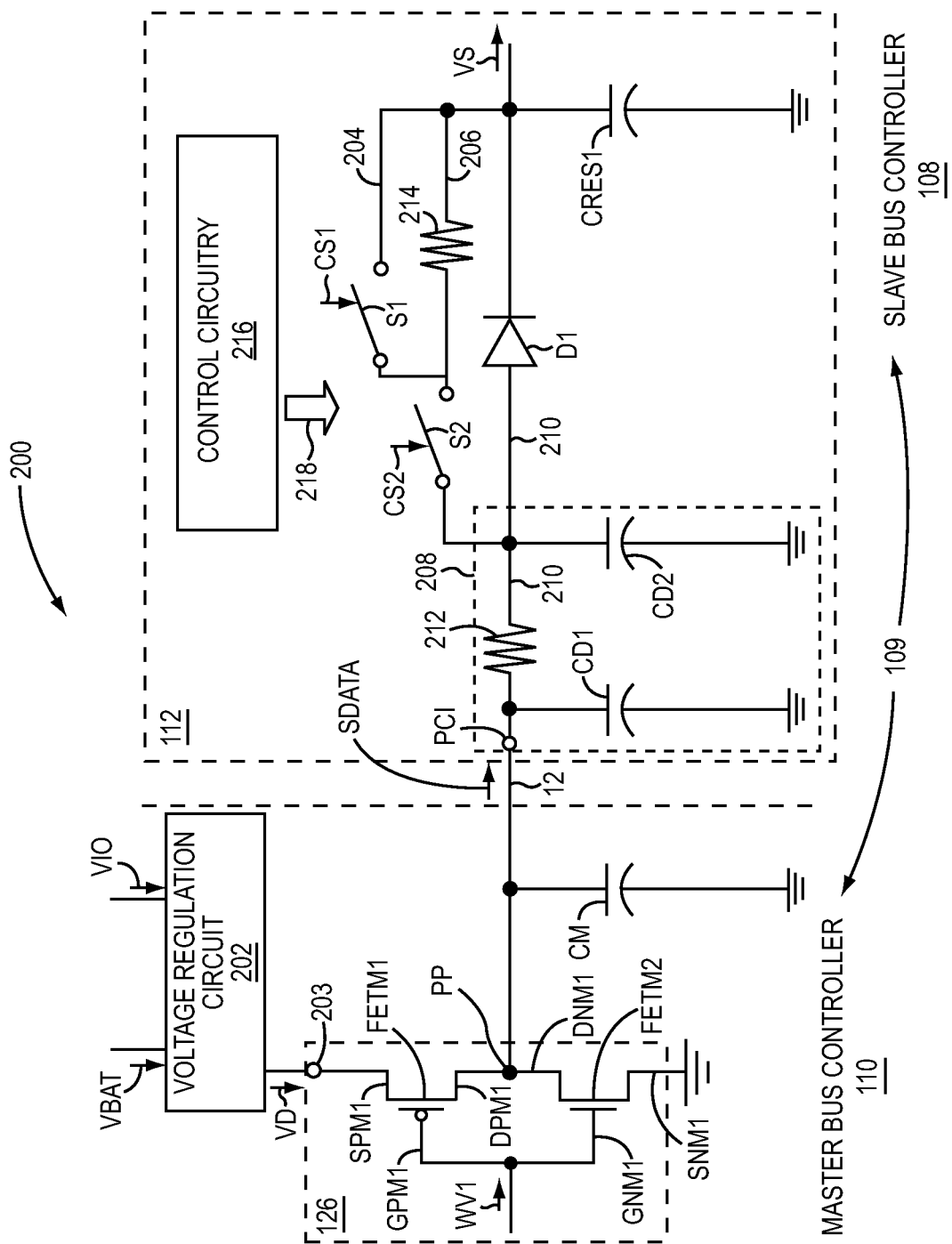
FIG. 12 illustrates an embodiment of a power management system with an embodiment of power conversion circuitry that includes a first switchable bypass path and a second switchable bypass path.

FIG. 12 illustrates one embodiment of a power management system 200 that may be provided in the bus interface system 109 to distribute power from the master bus controller 110 to the slave bus controller 108. The bus interface system 109 is similar to other embodiments of the bus interface system 109 described above. Thus, the bus line 12 is provided in the bus interface system 109 to connect the master bus controller 110 is coupled to the bus line 12. In accordance with a PWM bus protocol (such as the PWM bus protocols described above), the master bus controller 110 is configured to generate the input data signal SDATA and to transmit the input data signal SDATA along the bus line 12 to the slave bus controller 108. No other bus line is provided to couple the master bus controller 110 to the slave bus controller 108.

Again, as described above, the slave bus controller 108 is coupled to the bus line 12 so as to receive the input data signal SDATA from the master bus controller 110. The slave bus controller 108 includes an embodiment of the power conversion circuitry 112. The power conversion circuitry 112 is configured to convert the input data signal SDATA into a supply voltage VS. The power conversion circuitry 112 shown in FIG. 12 is part of the power management system 200 that is provided in the slave bus controller 108. The supply voltage VS may be utilized to power the decoder 10 (shown in FIGS. 10 and 11) along with other circuitry in the slave bus controller 108.

In FIG. 12, the master bus controller 110 includes a voltage regulation circuit 202 and a bypass capacitor CM, which are part of the power management system 200. The bypass capacitor CM provides an RF bypass and is optional. The voltage regulation circuit 202 is configured to convert a power source voltage VBAT into a supply voltage VD that powers the data modulator 126. As described above, the data modulator 126 is configured to generate the input data signal SDATA in accordance to a PWM bus protocol. For example, the data modulator 126 may be configured to provide the input data signal SDATA as shown in FIG. 2 or in accordance to any other description of the input data signal SDATA within the scope of this disclosure. The voltage regulation circuit 202 may be any kind of circuit configured to convert the power source voltage VBAT into the supply voltage VD. In this embodiment, the supply voltage VS is a regulated supply voltage. For example, the data modulator 126 may provide the input data signal SDATA as described in related U.S. patent application Ser. No. 14/659,292, filed Mar. 16, 2015, entitled "START OF SEQUENCE DETECTION FOR ONE WIRE BUS," hereby incorporated herein by reference in its entirety.

In some embodiments, the voltage regulation circuit 202 may be a switch converter or a low drop out (LDO) converter. In this example, the power source voltage VBAT is a battery voltage which is received by the master bus controller 110 from a battery. The voltage VIO is a control voltage that indicates a target supply voltage level for the supply voltage VD. The voltage regulation circuit 202 is operable to regulate the supply voltage VD so that the supply voltage VD is set to the target voltage level indicated by the control voltage VIO. The voltage regulation circuit 202 maintains the supply voltage VD approximately at the target supply voltage level indicated by the control voltage VIO despite fluctuations and irregularities in the power source voltage VBAT. The power management system 200 uses the control voltage VIO as a bus reference voltage. Alternatively, a bandgap circuit can be provided in the master bus controller 110 (shown in FIG. 11) that provides a reference voltage that is independent of the power source voltage VBAT. The reference voltage can then be used to regulate the supply voltage VD generated by the voltage regulation circuit 202. In this case, the voltage regulation circuit 202 is configured to generate the supply voltage VD between 2.5V to 2.9V. When the control voltage VIO is used, some embodiments of the voltage regulation circuit 202 have generated the supply voltage VD at 1.8V.

In FIG. 12, the supply voltage VD powers the data modulator 126. As described above, the data modulator 126 is configured to generate the input data signal SDATA in accordance to a PWM bus protocol. In this embodiment, the data modulator 126 includes a P-channel field effect transistor (PFET) FETM1 and a N-channel field effect transistor (NFET) FETM2. The supply voltage VD is received from the voltage regulation circuit 202 at a supply terminal 203. The PFET FETM1 includes a drain DPM1 a source SPM1, and a gate GPM1 while the NFET FETM2 includes a drain DNM1, a source SNM1, and a gate GNM1. The source SPM1 of the PFET FETM1 is coupled to the supply terminal 203 to receive the supply voltage VD from the voltage regulation circuit 202. The drain DPM1 of the PFET FETM1 is connected to the bus line 12 at a node PP. The gate GPM1 of the NFET FETM1 is operable to receive a control voltage WV1 from the data modulator 126. The drain DNM1 of the NFET FETM2 is coupled to the bus line 12 at the node PP. The source SNM1 of the NFET FETM2 is connected to ground, The gate GNM1 of the NFET FETM2 is also coupled to receive the control voltage WV1.

In this embodiment, the input data signal SDATA is an input signal voltage. When the control voltage WV1 is generated by the data modulator 126 to be low (which is the activation state for the PFET FETM1 and the deactivation state for the NFET FETM2), the NFET FETM2 is turned off, and the PFET FETM1 pulls the bus line 12 at node PP near the supply voltage VD. Accordingly, the input data signal SDATA is provided high (i.e., the charging state) and in an activation state. The data demodulator 126 is configured to operate the PFET FETM1 in an ohmic region when the control voltage WV1 is generated by the data modulator 126 to be low. Thus, after switching transients have subsided, the PFET FETM1 presents a resistance to the bus line 12. In one example, the PFET FETM1 presents a resistance of approximately 20 ohms to the bus line 12 at the node PP when the control voltage WV1 is low (and after switching transients have subsided).

On the other hand, when the control voltage WV1 is high (which is the deactivation state for the PFET FETM1 and the activation state for the NFET FETM2), the PFET FETM1 is turned off and the NFET FETM2 pushes the bus line 12 down near ground. Accordingly, the input data signal SDATA is provided low (i.e., the discharge state) and in a deactivation state. The data demodulator 126 is configured to operate the NFET FETM2 in an ohmic region when the control voltage WV1 is generated by the data modulator 126 to be high. Thus, after switching transients have subsided, the NFET FETM2 presents a resistance to the bus line 12. In one example, the NFET FETM2 presents a resistance of approximately 70 ohms to the bus line 12 at the node PP when the control voltage WV1 is high (and after switching transients have subsided).

The capacitor CM in the master bus controller 110 is coupled in shunt with respect to the bus line 12. Thus the capacitor CM provides high frequency filtering that removes voltage spikes from the input data signal SDATA due to the operation of the PFET FETM1. The capacitor CM is an optional RF bypass. In alternative embodiments, there may be a switchable bypass path (similar to the embodiment in FIG. 13) coupled to bypass the data modulator 126 at an output terminal of the voltage regulation circuit 202 and the bus line 12. The switchable bypass path may be coupled to the bus line 12 in the segment between the node PP and the capacitor CM.

The power conversion circuitry 112 in the slave bus controller 108 is configured to convert the input data signal SDATA into the supply voltage VS as mentioned above. In this manner, no other bus line but the bus line 12 needs to be provided since the power conversion circuitry 112 in the slave bus controller can be utilized not only to transfer data from the master bus controller 110 to the slave bus controller 108 but also to provide power to the slave bus controller 108. The power conversion circuitry 112 includes a reservoir capacitor CRES1 coupled to generate the supply voltage VS. The power conversion circuitry 112 further includes a rectifier D1 coupled between the bus line 12 and the reservoir capacitor CRES1 so that the rectifier D1 charges the reservoir capacitor CRES1 with the input data signal SDATA and so that the rectifier D1 blocks discharge from the reservoir capacitor CRES1.

The power conversion circuitry 112 also includes a first switchable bypass path 204 and a second switchable bypass path 206. Both the first switchable bypass path 204 and the second switchable bypass path 206 are coupled between the bus line 12 and the reservoir capacitor CRES1 such that the first switchable bypass path 204 and the second switchable bypass path 206 are each coupled to bypass the rectifier D1. The first switchable bypass path 204 is switchable to be opened and closed. Similarly, the second switchable bypass path 206 is also switchable to be opened and closed. In this embodiment, the power conversion circuitry 112 also includes a decoupling stage 208 coupled between the bus line 12 and the rectifier D1. As shown in FIG. 12, the decoupling stage 208 is coupled to an input terminal PCI from which the power conversion circuitry 112 receives the input data signal SDATA from the bus line 12. The coupling stage includes a capacitor CD1 and a capacitor CD2 both coupled in shunt with respect to a charging path 210 provided by the power conversion circuitry 112. Coupled in series within the charging path 210 is a resistor 212 which is connected between the capacitors CD1, CD2. The capacitor CD1 and the capacitor CD2 are noise and suppression capacitors that are sized to filter out noise and suppress voltage and current spikes along the charging path 210. In one embodiment, the charging capacitor CD1 is approximately 50 picofarads while the coupling capacitor is approximately 10 picofarads. The resistor 212 suppresses charging surges. In one embodiment, the resistor 212 has a resistance of approximately 200 hms.

In this embodiment, the rectifier D1 is provided by a diode connected in series within the charging path 210 between the decoupling stage 208 and the reservoir capacitor CRES1. The rectifier D1, which in this case is a diode, is forward-biased so that charge can flow into the reservoir capacitor CRES1. The rectifier D1 is also connected so that any discharge of the reservoir capacitor CRES1 is blocked by the rectifier D1. As such, the rectifier D1 in this embodiment is a half-wave rectifier. In alternative embodiments, other types of rectifiers may be provided, including but not limited to full wave rectifiers. All that is required by the rectifier D1 is that the rectifier D1 charges the reservoir capacitor CRES1 with the input data signal SDATA, but that discharge from the reservoir capacitor CRES1 be blocked by the rectifier D1. Thus, while input data signal SDATA is high and in a charging state, the rectifier D1 is coupled to transfer a charge into the reservoir capacitor CRES1 so that the reservoir capacitor CRES1 generates the supply voltage VS. However, while the input data signal SDATA is low, and thus in a discharging state, the rectifier D1 is coupled to block the discharge of the reservoir capacitor CRES1 in order to maintain the supply voltage level of the supply voltage VS relatively steady.

One of the problems with the rectifier D1 is that it requires a turn on voltage before the rectifier D1 is capable of charging the reservoir capacitor CRES1 with the input data signal SDATA. Accordingly, the first switchable bypass path 204 and the second switchable bypass path 206 are provided to increase the speed at which the reservoir capacitor CRES1 is charged, as is explained in further detail below. In this embodiment, the second switchable bypass path 206 is coupled between the decoupling stage 208 and the reservoir capacitor CRES1 such that the second switchable bypass path 206 is coupled to bypass the rectifier D1. More specifically, the second switchable bypass path 206 shown in FIG. 12 is coupled in parallel with the rectifier D1 and thus provides an alternate charging path. The second switchable bypass path 206 is switchable to be opened and closed.

In this embodiment, the second switchable bypass path 206 includes a resistor 214 coupled in series within the second switchable bypass path 206. The first switchable bypass path 204 is connected to the second switchable bypass path 206 such that the first switchable bypass path 204 is coupled to bypass the resistor 214 in the second switchable bypass path 206. More specifically, the first switchable bypass path 204 includes a switch S1 coupled in series within the first switchable bypass path 204. Thus, when the switch S1 is open, the first switchable bypass path 204 is open, and when switch S1 is closed, the first switchable bypass path 204 is closed. The second switchable bypass path 206 also includes a switch S2 coupled in series within the second switchable bypass path 206. Thus when the switch S2 is open, the second switchable bypass path 206 is open, and when the switch S2 is closed, the second switchable bypass path 206 is closed.

In this embodiment, the power conversion circuitry 112 includes control circuitry 216. The control circuitry 216 is configured to generate a control output 218 to open and close the switches S1, S2. For example, the control output 218 may include a switch control signal CS1 that is received by the switch S1. When the switch control signal CS1 is in a first state, the switch S1 is open. However, while the switch control signal CS1 is in a second state, the switch S1 is closed. Similarly, the control output 218 may include a switch control signal CS2. When the switch control signal CS2 is in a first state, the switch S2 may be open. However, when the switch control signal CS2 is in a second state, the switch S2 may be closed. In this manner, the control circuitry 216 is operable to generate the control output 218 so as to open and close the switches S1 and S2.

Referring now to FIG. 2 and FIG. 12, the switches S1 and S2 may be opened and closed by the power conversion circuitry 112 in three different configurations depending on where in the data frame the input data signal SDATA is being provided. The master bus controller 110 is configured to hold the input data signal SDATA in a charging state (i.e., the input data signal SDATA is high) during a communication interlude between the master bus controller 110 and the slave bus controller 108. In this example, the communication interlude is provided during the timeslot TS[7]. In other words, at the activation edge AE[7], the timeslots TS[0]-TS[6] that include the data pulses DP[0]-DP[6] of the data frame have finished. Also, at startup, prior to the first data frame transmitted by the master bus controller 110 to the slave bus controller 108, the master bus controller 110 is configured to hold the input data signal SDATA in the charging state after the power management system 200 has been fully turned on. Thus, during a communication interlude in the time slot TS[7], the master bus controller 110 and the slave bus controller 108 are in a communication interlude where data pulses DP are not being provided during a communication session. Instead, the master bus controller 110 is configured simply to hold the input data signal SDATA in the charging state (e.g., in a high state). Thus, after a charging time interval (which is explained in further detail below), and before the initiation of the next data frame, the first switchable bypass path 204 and the second switchable bypass path 206 are switched in accordance with an idling switch state of the power management system 200.

More specifically, during the idling switch state of the power management system 200, the control circuitry 216 is configured to provide the first switchable bypass path 204 such that the first switchable bypass path 204 is open and provide the second switchable bypass path 206 such that the second switchable bypass path is closed. Thus, during the idling switch state of the power management system 200, the reservoir capacitor CRES1 is charged by a charge current provided through the second switchable bypass path 206 to the reservoir capacitor CRES1. Note that since the input data signal SDATA is simply being held in the charging state (the high state) by the master bus controller 110, rectification by the rectifier D1 is not needed, and thus the rectifier D1 is bypassed. However, the first switchable bypass path 204 is open, and thus no discharge current can flow through the first switchable bypass path 204. However, the problems with the turn on voltage of the rectifier D1 are obviated during the idling switch state of the power management system 200 because the reservoir capacitor CRES1 is charged with the input data signal SDATA through the second switchable bypass path 206, which is closed.

Referring again to FIG. 2 and FIG. 12, the master bus controller 110 is configured to initiate communication of a data frame along the bus line 12 with the input data signal SDATA. For example, in FIG. 2, at the end of the timeslot TS[7], the master bus controller 110 is configured to initiate communication of the next data frame along the bus line 12 by providing the input data signal SDATA in a discharging state (i.e., the low voltage state). Thus prior to the activation edge AE[0] of the next data frame, the master bus controller 110 is configured to initiate communication of the next data frame by providing the input data signal SDATA in the discharging state (e.g., the low voltage state). This indicates to the slave bus controller 108 and in particular to the power conversion circuitry 112 that the master bus controller 110 is or will begin transmitting data pulses for the next data frame to the slave bus controller 108. Alternatively or additionally, the master bus controller 110 may initiate communication of the data frame simply by providing the activation edge AE[0], thereby indicating to the slave bus controller 108 and the power conversion circuitry 112 that the next data frame is being provided. It should be noted that the data modulator 126, the decoder 10, and the slave bus controller 108 may be configured to initiate data frames with a sequence of data pulses provided in accordance with a start of sequence (SOS) pulse pattern as described in related U.S. patent application Ser. No. 14/659,292, filed Mar. 16, 2015, entitled "START OF SEQUENCE DETECTION FOR ONE WIRE BUS," hereby incorporated herein by reference in its entirety. Thus, the input data signal SDATA may be provided in a discharging state (i.e., the low voltage state) either before or at a beginning of the sequence of data pulses.

The control circuitry 216 of the power conversion circuitry 112 in the slave bus controller 108 is configured to open the second switchable bypass path 206 in the power conversion circuitry 112 in response to the input data signal SDATA indicating that the master bus controller 110 has initiated communication of the data frame along the bus line 12. Thus, in this embodiment, the slave bus controller 108 is configured to open the second switchable bypass path 206 in response to the master bus controller 110 dropping the input data signal SDATA to the communication state once the time slot TS[7] ends. The slave bus controller 108 is configured to maintain the first switchable bypass path 204 as open.

Accordingly, during a communication session where data pulses DP[0]-DP[6] are being provided during timeslots TS[0]-TS[6] of the data frame, the power management system 200 operates in a communication session state. During the communication session state of the power management system 200, the first switchable bypass path 204 is open, and the second switchable bypass path 206 is also open. The power management system 200 is provided in the communication session state after the end of the time slot TS[7] when the input data signal SDATA is dropped to the decharging state and throughout the timeslots TS[0]-TS[6]. Since the first switchable bypass path 204 and the second switchable bypass path 206 are open during the communication session state, the rectifier D1 is not bypassed but rather, a rectified charging current can be produced from the input data signal SDATA that propagates through the charging path 210 to charge the reservoir capacitor CRES1. At start up, the rectified charging current does pass through the reservoir capacitor CRES1 to charge the reservoir capacitor CRES1. However, the supply voltage VS may not drop sufficiently to turn on the rectifier D1 during the communication interval to generate the rectified charging current. In any case, the rectifier D1 is coupled to charge the reservoir capacitor CRES1 with the input data signal SDATA so if a sufficient voltage drop is experienced, the rectified charging current will propagate through the rectifier D1 to charge the reservoir capacitor CRES1. Since the data pulses DP are being provided and the input data signal SDATA is not simply being held in the charging state, rectification from the rectifier D1 is needed to prevent the reservoir capacitor CRES1 from discharging back into the bus line 12. The rectification provided by the rectifier D1 maintains the supply voltage VS generated by the reservoir capacitor CRES1 relatively steady.

After the timeslot TS[6] is over, the master bus controller 110 is again configured to hold the input data signal SDATA in the charging state during the communication interlude between the master bus controller 110 and the slave bus controller 108. The beginning of the communication interlude is thus synchronized with the activation edge AE[7] at the beginning of the time slot TS[7]. The power management system 200 is operable in a fast charging switch state for a charging time interval after the beginning of the communication interlude between the master bus controller 110 and the slave bus controller 108. The control circuitry 216 is configured to close the first switchable bypass path 204 and to close the second switchable bypass path 206 in response to the communication interlude to place the power management system 200 in the fast charging switch state.

In this embodiment, the control circuitry 216 is configured to close the first switchable bypass path 204 in the power conversion circuitry 112 in response to the activation edge AE[7]. Additionally, the control circuitry 216 is configured to close the second switchable bypass path 206 in the power conversion circuitry 112 in response to the activation edge AE[7]. While the power management system 200 is operating in the fast charging switch state, a charging current bypasses both the rectifier D1 and the resistor 214, since the first switchable bypass path 204 and the second switchable bypass path 206 are both closed. The power management system 200 is maintained in the fast charging switch state for a charging time interval. In this manner, the reservoir capacitor CRES1 is quickly recharged to a maximum voltage level after the communication interlude has begun.

Once the charging time interval has passed after closing the first switchable bypass path 204 and the second switchable bypass path 206 in response to the communication interlude, the control circuitry is configured to open the first switchable bypass path 204. In this embodiment, after the charging time interval has passed since the activation edge AE[7] was provided in the input data signal SDATA, the control circuitry 216 is configured to open the first switchable bypass path 204. In this case, the power management system 200 is back in the idling switch state. The cycle of the idling switch state, the communication session state, and the fast charging switch state can be repeated during the communication interlude and the communication session for the next data frame. In one embodiment, the charging time interval is eight times greater than one of the time slots TS[0]-TS[6]. For example, in one embodiment, the charging time interval is approximately 2-3 μms.

Figure 13:
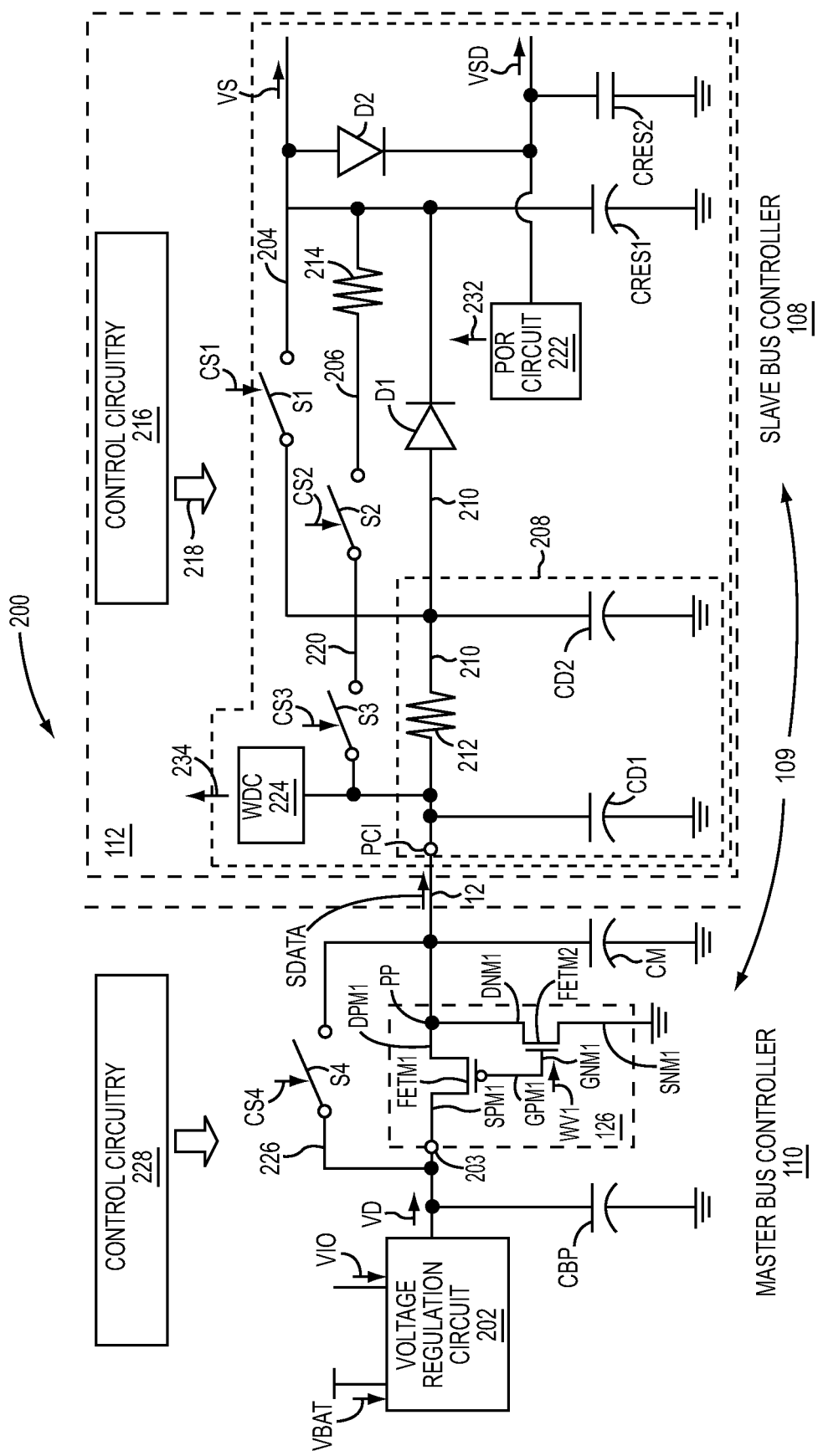
FIG. 13 illustrates an embodiment of a power management system in an embodiment of a bus interface system with power conversion circuitry that includes a first switchable bypass path, second switchable bypass path, and a third switchable bypass path.

FIG. 13 illustrates another embodiment of the power management system 200. With regard to the slave bus controller 108, the power management system 200 includes another embodiment of the power conversion circuitry 112 within the slave bus controller 108 of the bus interface system 109. The power conversion circuitry 112 shown in FIG. 13 includes the decoupling stage 208, the first switchable bypass path 204, the second switchable bypass path 206, the rectifier D1, and the reservoir capacitor CRES1. Like in the embodiment shown in FIG. 12, the first switchable bypass path 204 only includes the switch S1 and does not include a resistor in order to provide fast charging. However, in this embodiment, the first switchable bypass path 204 is connected in parallel with the second switchable bypass path 206. Thus the first switchable bypass path 204 is coupled between the decoupling stage 208 and the reservoir capacitor CRES1 so as to bypass the rectifier D1 and so as to bypass the second switchable bypass path 206. In addition, the power conversion circuitry 112 shown in FIG. 13 also includes a third switchable bypass path 220, a diode D2, another reservoir capacitor CRES2, a Power-on-Reset (POR) circuit 222, and a watchdog circuit (WDC) 224.

The third switchable bypass path 220 is switchable to be opened and closed. More specifically, the third switchable bypass path 220 includes a switch S3 that is operable to be opened and closed. Thus, the control circuitry 216 generates the control output 218 to include the switch control output CS1, the switch control output CS2 (as explained above with respect to FIG. 12), and a switch control output CS3. The switch S3 receives the switch control output CS3 from the control circuitry 216. When the control signal CS3 is in a first state, the switch S3 is open, and thus the third switchable bypass path 220 is open. On the other hand, when the control signal CS3 is in a second state, the switch CS3 is closed, and thus the third switchable bypass path 220 is closed. In this embodiment, the third switchable bypass path 220 only includes the switch S3 and does not include any resistor.

The third switchable bypass path 220 is coupled between the bus line 12 and the rectifier D1 so as to bypass the resistor 212 of the decoupling stage 208. In this example, the supply voltage VS generated by the reservoir capacitor CRES1 is used as an analog supply voltage to supply analog components within the slave bus controller 108. The diode D2 is coupled between the reservoir capacitor CRES1 and the reservoir capacitor CRES2 such that the reservoir capacitor CRES2 is configured to generate a supply voltage VSD that is below the supply voltage VS. More specifically, the diode D2 is forward biased from the reservoir capacitor CRES1 to the reservoir capacitor CRES2. Thus there is a voltage drop from the reservoir capacitor CRES1 to the reservoir capacitor CRES2 equal approximately to the turn on voltage of the diode D2. In this embodiment, the supply voltage VSD is approximately 0.7 V below the supply voltage VS. The supply voltage VSD is used as a digital supply voltage in order to power digital components within the slave bus controller 108.

With respect to the master bus controller 110, the power management system 200 includes the voltage regulation circuit 202, which operates in the same manner described above with respect to FIG. 12, and the capacitor CM. The data modulator 126 includes the PFET FETM1, which is operated in the same manner described above with respect to FIG. 12. In addition, a capacitor CBP is also coupled in shunt. The capacitor CBP helps reduce ripple variations and decouples the voltage regulation circuit 202 from any input data signals transmitted along the bus line from the slave bus controller 108 to the master bus controller 110. In addition, the power management system 200 includes a fourth switchable bypass path 226 which is included in the master bus controller 110. The fourth switchable bypass path 226 is switchable to be opened and to be closed. More specifically, the fourth switchable bypass path 226 includes a switch S4 that is coupled in series within the fourth switchable bypass path 226. In this embodiment, the fourth switchable bypass path 226 only includes a switch and does not include a resistor. The switch S4 is configured to be opened and closed thereby opening and closing the fourth switchable bypass path 226.

As shown in FIG. 13, the master bus controller 110 includes control circuity 228. Control circuitry 228 is configured to generate a control output 230. The control output 230 includes a control signal CS4 that is received by the switch S4 in the fourth switchable bypass path 226. When the control signal CS4 is generated by the control circuitry 228 in a first state, the switch S4 and therefore the fourth switchable bypass path 226 is open. On the other hand, when the control signal CS4 is generated by the control circuitry 228 in a second state, the switch S4 and therefore the fourth switchable bypass path 226 is closed. In this manner, the control circuitry 228 is operable to open and close the switch S4. The fourth switchable bypass path 226 is connected between the voltage regulation circuit 202 and the bus line 12 so as to bypass the data modulator 126. In this embodiment, the fourth switchable bypass path 226 is connected from the drain DPM1 of the PFET FETM1 to the source SPM1 of the PFET FETM1. Thus, when the fourth switchable bypass path 226 is closed, the voltage drop across the PFET FETM1 is bypassed, and the first input data signal SDATA is generated to have a voltage level approximately at a voltage level of the supply voltage VD generated by the voltage regulation circuit 202.

Referring now to FIGS. 2 and 13, the data modulator 126 is configured to generate the input data signal SDATA that defines the data pulses DP[0]-DP[6] during the data frame. As explained above with respect to FIG. 12, the voltage regulation circuit 202 is configured to convert the power source voltage VBAT into the supply voltage VD that powers the data modulator 126. As explained in further detail below, the data modulator 126 is configured to generate the data pulses DP[0]-DP[6] with the PFET FETM1 while the fourth switchable bypass path 226 is open. However, during a communication interlude such as the communication interlude shown during time slot TS[7] in FIG. 2, the control circuitry 228 is configured to close the fourth switchable bypass path 226. In this manner, the master bus control 110 is configured to hold the input data signal SDATA in a charging state during the communication interlude between the master bus controller 110 and the slave bus controller 108. However, with respect to the master bus controller 110 shown in FIG. 13, the input data signal SDATA is held at approximately the supply voltage VD during the communication interlude since the fourth switchable bypass path 226 is closed.

Referring again to FIGS. 2 and 13, the power management system 200 is operable in the idling switch state, the communication session state, and the fast charging switch state like the power management system 200 described above with respect to FIG. 12. More specifically, during the idling switch state after the charging time interval and before the initiation of a data frame during a communication interlude, the control circuitry 216 of slave bus controller 108 is configured to generate the control signals CS1, CS2, CS3 such that the first switchable bypass path 204 is open, the second switchable bypass path 206 is closed, and the third switchable bypass path 220 is open. Furthermore, the control circuitry 228 of the master bus controller 110 is configured to generate the control signal CS4 such that the fourth switchable bypass path 226 is closed. Thus, during the idling switch state, the master bus controller 110 holds the input data signal SDATA at approximately the supply voltage VD. A charging current in the slave bus controller 108 passes through the resistor 212 of the decoupling stage 208 and through the second switchable bypass path 206 to charge the reservoir capacitor CRES1. Furthermore, a charge current also passes through the rectifier D2 in order to charge the reservoir capacitor CRES2 so that the reservoir capacitor CRES2 generates the supply voltage VSD.

In response to the master bus controller 110 initiating communication of a data frame, the control circuitry 216 of the slave bus controller 108 is configured to open the second switchable bypass path 206. Furthermore, in response to the master bus controller 110 initiating communication of the data frame, the control circuitry 228 of the master bus controller 110 is configured to open the fourth switchable bypass path 226. Thus, the power management system 200 is switched into the communication session state. With respect to FIG. 2, the master bus controller 110 initiates communication of a data frame as shown in FIG. 2 by dropping the input signal SDATA low once the time slot TS[7] ends. The power management system 200 is provided in the communication session state while the master bus controller 110 and the slave bus controller 108 are communicating along the bus line 12. Thus, the data modulator 126 can provide the data pulses DP[0]-DP[6] during the timeslots TS[0]-TS[6] shown in FIG. 2. During the communication session state, the first switchable bypass path 204 is open, the second switchable bypass path 206 is open, the third switchable bypass path 220 is open, and the fourth switchable bypass path 226 is open.

In response to a communication interlude between the master bus controller 110 and the slave bus controller 108, the control circuitry 216 is configured to generate the control signals CS1, CS2, and CS3 so that the first switchable bypass path 204 is closed, the second switchable bypass path 206 is closed, and the third switchable bypass path 220 is closed. Furthermore, the control circuitry 228 of the master bus controller 110 is configured to close the fourth switchable bypass path 226 in response to the communication interlude. Thus, the power management system 200 shown in FIG. 13 is switched into the fast charging switch state in response to the communication interlude. The power management system 200 is maintained in the fast charging switch state for the charging time interval after the beginning of the communication interlude. Thus during the fast charging switch state, the master bus controller 110 holds the input data signal SDATA approximately at the supply voltage VD. A charging current in the power conversion circuitry propagates through the third switchable bypass path 220 thereby bypassing the resistor 212 in the decoupling stage 208. The charging current also propagates through the first switchable bypass path 204 thereby bypassing the rectifier D1 and the resistor 214 in the second switchable bypass path 206. In this manner, the charging current that recharges the reservoir capacitor CRES1 and the reservoir capacitor CRES2 experiences minimum resistance and is recharged faster.

With respect to FIG. 2, the beginning of the communication interlude is marked by the activation edge AE[7] at the beginning of the timeslot TS[7]. Once the charging time interval has passed after closing the first switchable bypass path 204 in the power conversion circuitry 112 in response to the communication interlude and after closing the third switchable bypass path 220 in the power conversion circuitry 112 in response to the communication interlude, the control circuitry 216 of the slave bus controller 108 is configured to open the first switchable bypass path 204 and open the third switchable bypass path 220. Accordingly, the power management system 200 is back in the idling switch state. The cycle can again be repeated as data frames and communication interludes continue to be provided through the bus interface system 109

The POR circuit 222 in the power conversion circuitry 112 of the slave bus controller 108 is provided to monitor the supply voltage VSD. If the supply voltage VSD is provided below a threshold voltage, this indicates that the supply voltage VS and the supply voltage VSD are insufficient to provide sufficient power so as to operate the switches S1, S2, S3 of the power conversion circuitry 112. This may occur during dead battery conditions or at startup before the slave bus controller 108 has had sufficient time to be charged. The POR circuit 222 is configured to detect when the supply voltage VSD has been provided above the threshold voltage level. The POR circuit 222 generates a POR signal 232. The POR circuit 222 generates the POR signal 232 such that the POR signal 232 indicates that the supply voltage VSD is above the threshold voltage once the POR circuit 222 has detected that the supply voltage VSD is above the threshold voltage. The control circuitry 216 receives the POR signal 232. Once the POR signal 232 indicates that the supply voltage VSD is above the threshold voltage, the control circuitry 216 is configured to operate the switches S1, S2, S3 as described above. In particular, the control circuitry 216 may initially provide the switches S1, S2, S3 in the manner described above with respect to the idling switch state for the power management system 200.

The WDC 224 in the power conversion circuitry 112 of the slave bus controller 108 is configured to monitor the input data signal SDATA. In this example, the input data signal SDATA is an input data voltage. If the input data signal SDATA drops below a threshold voltage level for a temporal period, the WDC 224 detects a reset condition since the input data signal SDATA is not supplying sufficient charge to maintain the slave bus controller 108 operating appropriately. In this case, the WDC 224 is configured to generate a watchdog signal 234 that indicates when the WDC 224 has detected the reset condition (i.e., the input data signal SDATA has been provided below the threshold voltage level for the time interval). The control circuitry 216 receives the watchdog signal 234 and responds by requesting a reset for the slave bus controller 108.

Figure 14:
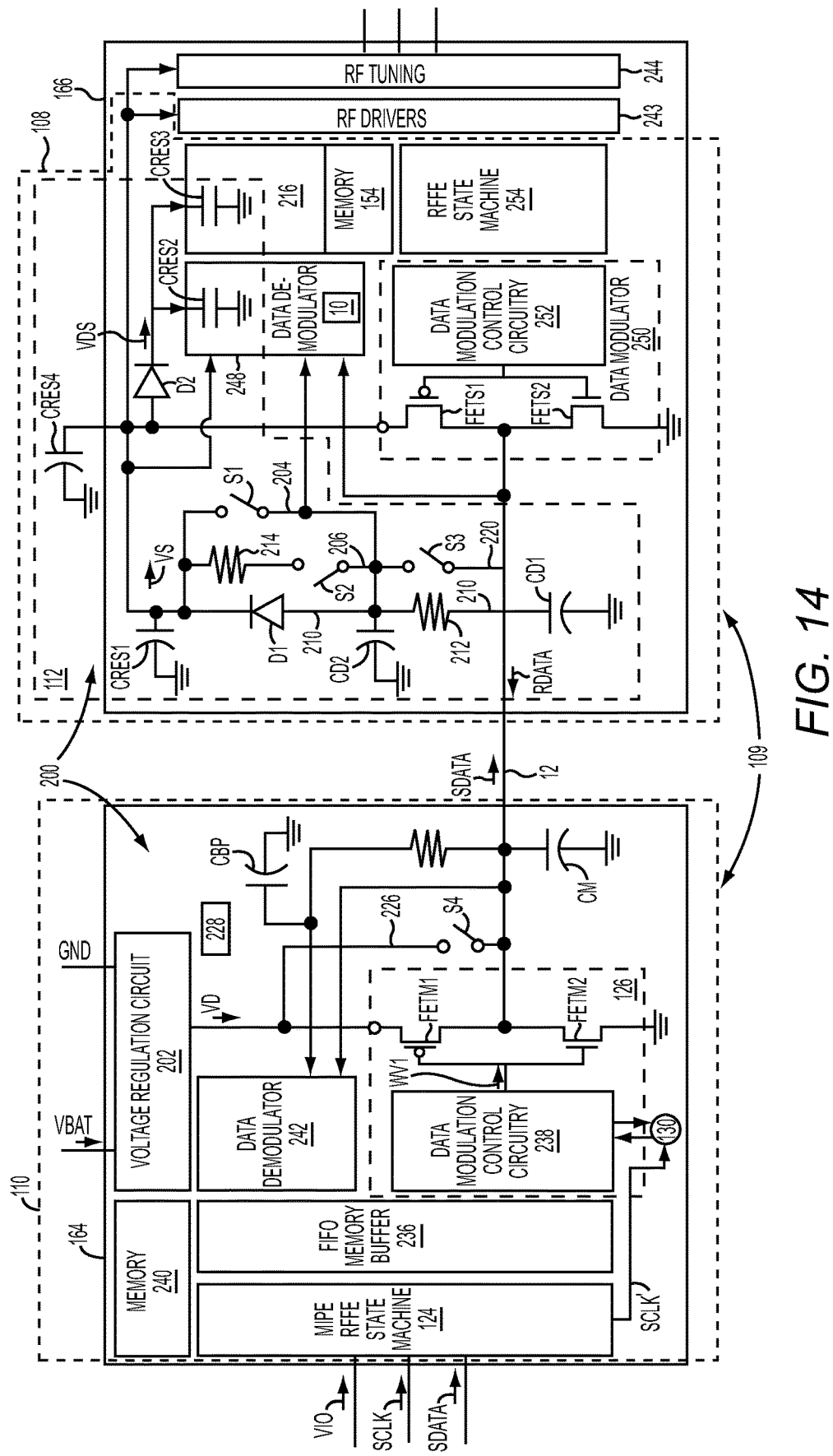
FIG. 14 illustrates an embodiment of a bus interface system having a master bus controller and a slave bus controller formed on IC packages and including an embodiment of the power management system shown in FIG. 13.

FIG. 14 illustrates an embodiment of the bus interface system 109 with an embodiment of the master bus controller 110 formed on the IC package 164 and an embodiment of the slave bus controller 108 formed on the IC package 166. An embodiment of the power management system 200 is provided in the bus interface system 109. The power management system 200 is the same as the power management system 200 shown in FIG. 13 except that in this embodiment, the power conversion circuitry 112 in the slave bus controller 108 includes reservoir capacitors CRES3, CRES4. The master bus controller 110 shown in FIG. 14 includes the MIPI RFFE state machine 124 described above with respect to FIGS. 8, 10, and 11 in order to convert information from the MIPI bus into the PWM protocol as explained above. Since the MIPI bus may be faster than the data rate provided by the bus interface system 109, a First In First Out (FIFO) memory buffer 236 is provided to store command address and payload information which will be converted into data pulses for data frames transmitted using the input data signal SDATA by the data modulator 126.

In this embodiment, the data modulator 126 includes data modulation control circuitry 238, the PFET FETM1, and the NFET FETM2. The data modulation control circuitry 238 generates the control signal WV1 to control the PFET FETM1 and the NFET FETM2, as explained above. More specifically, the control signal receives an instruction from the FIFO memory buffer 236 and generates data pulses in the input data signal SDATA using the PFET FETM1 and the NFET FETM2 in accordance with the PWM protocol as described above.

A memory 240 is provided in the master bus controller 110 to store data. The master bus controller 110 further includes a demodulator that is coupled to the bus line 12. In this manner, as explained in further detail below, the data demodulator 242 may receive an input data signal RDATA formatted in accordance to the PWM protocol from the slave bus controller 108 along the bus line 12. The data demodulator 242 is configured to decode data pulses on the input data signal RDATA from the slave bus controller 108 based on PWM protocol. Symbols decoded from these data pulses may then be stored in the memory 240 of the master bus controller 110. The power management system 200 includes the four switchable bypass paths 204, 206, 220, 226, the voltage regulation circuit 202, the capacitor CBP, and the capacitor CM described above with respect to FIGS. 12 and 13. The control circuitry 228 is configured to operate the fourth switchable bypass path 226 as described above with respect to FIG. 13.

An embodiment of the slave bus controller 108 is also shown in FIG. 14 and formed in the IC package 166. Also provided in the IC package 166 may be RF drivers 243 and RF tuning 244 in order to receive RF signals. In this embodiment, the power management system 200 includes the capacitor CD1, the resistor 212, the capacitor CD2, the rectifier D1, the reservoir capacitor CRES1, the reservoir capacitor CRES2, the first switchable bypass path 204, the second switchable bypass path 206, the third switchable bypass path 220, and the diode D2 as described above with respect to FIG. 13. The control circuitry 216 is configured to operate the first switchable bypass path 204, the second switchable bypass path 206, and the third switchable bypass path 220 as described above with respect to FIG. 13. The slave bus controller 108 also includes a data demodulator 248 which includes the decoder 10 to decode the data pulses of the input data signal SDATA from the master bus controller 110 in accordance with the PWM protocol as described above. The power conversion circuitry 112 further includes a reservoir capacitor CRES3 which provides additional capacitance for generating the supply voltage VDS. The control circuitry 216 and the data demodulator 248 are powered by the supply voltage VDS.

Furthermore, as shown in FIG. 14, the slave bus controller 108 further includes a data modulator 250. The data modulator 250 is configured to generate the input data signal RDATA which may be provided during certain types of data frames. For example, if the master bus controller 110 sends a read command to the slave bus controller 108, the slave bus controller 108 may generate the input data signal RDATA with data pulses representing the information requested by the master bus controller 110. It should be noted that the input data signal SDATA is not being provided by the master bus controller 110 during the transmission of the input data signal RDATA by the slave bus controller 108. Thus the input data signal SDATA is not being provided to the power conversion circuitry 112. Thus, the capacitance in the power conversion circuitry 112 should be enough to power the slave bus controller 108 while the data modulator 250 is generating the data pulses on the bus line 12. In particular, the capacitance CM and the capacitance CD1 should be sufficiently small relative to the reservoir capacitance CRES1 so as to not transfer excessive charge to the reservoir capacitor CRES1 and prevent too high a voltage drop in the supply voltage VS and the supply voltage VSD. To generate the input data signal RDATA, the data modulator 250 includes data modulation control circuitry 252, a PFET FETS1, and an NFET FETS2. The PFET FETS1 and the NFET FETS2 are powered by the supply voltage VS from the power conversion circuitry 112. Furthermore, the PFET FETS1 and the NFET FETS2 are in a push pull configuration like the PFET FETM1 and the NFET FETM2 of the data modulator 126 of the master bus controller 110. The data modulation control circuitry 252 controls the PFET FETS1 and the NFET FETS2 so as to generate data pulses in accordance to the PWM protocol and thus generate the input data signal RDATA along the bus line 12 to the master bus controller 110. The slave bus controller 108 includes an RFFE state machine 254 and a memory 154 which can provide the data bits to the data modulator 250. The data modulator 250 provides data pulses in the input data signal RDATA to represent these data bits and thereby transmit the requested information to the master bus controller 110 along the bus line 12.

Those skilled in the art will recognize improvements and modifications to the preferred embodiments of the present disclosure. All such improvements and modifications are considered within the scope of the concepts disclosed herein and the claims that follow.

What is claimed is:

1. A bus interface system, comprising:
 a single bus line consisting of a single wire;
 a master bus controller coupled to the single bus line, the master bus controller is configured to generate a first input data signal and to transmit the first input data signal along the single bus line; and
 a slave bus controller coupled to the single bus line, wherein no other bus line connects the master bus controller and the slave bus controller, and wherein the slave bus controller is configured to receive the first input data signal from the master bus controller over the single bus line, wherein the slave bus controller comprises power conversion circuitry configured to convert the first input data signal into a first supply voltage.

2. The bus interface system of claim 1 wherein the power conversion circuitry comprises:
 a reservoir capacitor coupled to generate the first supply voltage;
 a rectifier coupled between the single bus line and the reservoir capacitor so that the rectifier charges the reservoir capacitor with the first input data signal and so that the rectifier blocks discharge from the reservoir capacitor; and
 a first switchable bypass path coupled between the single bus line and the reservoir capacitor such that the first switchable bypass path is coupled to bypass the rectifier, wherein the first switchable bypass path is switchable to be opened and to be closed.

3. The bus interface system of claim 2, wherein:
 the master bus controller is configured to initiate communication of a data frame along the single bus line with the first input data signal; and
 the slave bus controller is configured to open the first switchable bypass path in the power conversion circuitry in response to the first input data signal indicating that the master bus controller has initiated the communication of the data frame.

4. The bus interface system of claim 3, wherein
 the master bus controller is configured to hold the first input data signal in a charging state during a communication interlude between the master bus controller and the slave bus controller; and
 the slave bus controller is configured to close the first switchable bypass path in the power conversion circuitry in response to the communication interlude.

5. The bus interface system of claim 2 wherein:
 the first switchable bypass path includes a first resistor connected in series within the first switchable bypass path.

6. The bus interface system of claim 5 wherein the power conversion circuitry further comprises a second switchable bypass path that is switchable to be opened and to be closed and wherein the second switchable bypass path is connected to the first switchable bypass path such that the second switchable bypass path is coupled to bypass the first resistor in the first switchable bypass path.

7. The bus interface system of claim 6 wherein:
the master bus controller is configured to initiate communication of a data frame along the single bus line with the first input data signal; and
the master bus controller is configured to hold the first input data signal in a charging state during a communication interlude between the master bus controller and the slave bus controller; and
the slave bus controller is configured to:
  open the first switchable bypass path in the power conversion circuitry in response to the first input data signal indicating that the master bus controller has initiated the communication of the data frame;
  close the first switchable bypass path in the power conversion circuitry in response to the communication interlude;
  close the second switchable bypass path in the power conversion circuitry in response to the communication interlude; and
  open the second switchable bypass path once a charging time interval has passed after closing the second switchable bypass path in the power conversion circuitry in response to the communication interlude.

8. The bus interface system of claim 6 further comprising a decoupling stage coupled between the single bus line and the rectifier.

9. The bus interface system of claim 8 wherein the master bus controller comprises a voltage regulation circuit and a data modulator, wherein:
the data modulator is configured to generate the first input data signal; and
the voltage regulation circuit is configured to convert a power source voltage into a second supply voltage that powers the data modulator.

10. The bus interface system of claim 2 wherein:
the first switchable bypass path only includes a first switch coupled in series within the first switchable bypass path, the first switch is switchable so as to open and close the first switchable bypass path.

11. The bus interface system of claim 10 wherein the power conversion circuitry further comprises a second switchable bypass path coupled between the single bus line and the reservoir capacitor such that the second switchable bypass path is coupled to bypass the rectifier, wherein the second switchable bypass path comprises:
a second switch coupled in series within the second switchable bypass path so as to open and close the second switchable bypass path; and
a first resistor coupled in series within the second switchable bypass path.

12. The bus interface system of claim 2 wherein the power conversion circuitry further comprises a decoupling stage coupled between the single bus line and the rectifier.

13. The bus interface system of claim 12 wherein the decoupling stage comprises a resistor connected in series between the single bus line and the rectifier.

14. The bus interface system of claim 13 wherein the power conversion circuitry further comprises a second switchable bypass path that is switchable to be opened and to be closed, the second switchable bypass path is coupled between the single bus line and the rectifier so as to bypass the resistor.

15. The bus interface system of claim 14 wherein:
the master bus controller is configured to initiate communication of a data frame along the single bus line with the first input data signal;
the master bus controller is configured to hold the first input data signal in a charging state during a communication interlude between the master bus controller and the slave bus controller; and
the slave bus controller is configured to:
  close the second switchable bypass path in the power conversion circuitry in response to the communication interlude; and
  open the second switchable bypass path once a charging time interval has passed after closing the second switchable bypass path in the power conversion circuitry in response to the communication interlude.

16. The bus interface system of claim 2 wherein the master bus controller comprises a voltage regulation circuit and a data modulator, wherein:
the data modulator is configured to generate the first input data signal so that the first input data signal defines a set of data pulses during a data frame;
the voltage regulation circuit is configured to convert a power source voltage into a second supply voltage that powers the data modulator; and
a second switchable bypass path is connected between the voltage regulation circuit and the single bus line so as to bypass the data modulator, wherein the second switchable bypass path is switchable to be opened and to be closed.

17. The bus interface system of claim 16 wherein the slave bus controller is configured to close the second switchable bypass path in the power conversion circuitry in response to a communication interlude.

18. The bus interface system of claim 2 wherein the first switchable bypass path only includes a first switch coupled in series within the first switchable bypass path, the first switch is switchable so as to open and close the first switchable bypass path, and wherein the power conversion circuitry further comprises:
a second switchable bypass path coupled between the single bus line and the reservoir capacitor such that the second switchable bypass path is coupled to bypass the rectifier, the second switchable bypass path comprises:
  a second switch coupled in series within the second switchable bypass path so as to open and close the second switchable bypass path; and
  a first resistor coupled in series within the second switchable bypass path;
a decoupling stage that is coupled between the single bus line and the rectifier, wherein the decoupling stage comprises a second resistor connected in series between the single bus line and the rectifier; and
a third switchable bypass path that is switchable to be opened and to be closed, the third switchable bypass path is coupled between the single bus line and the second switchable bypass path so as to bypass the second resistor.

19. The bus interface system of claim 18, wherein:
the master bus controller is configured to initiate communication of a data frame along the single bus line with the first input data signal;
the master bus controller is configured to hold the first input data signal in a charging state during a communication interlude between the master bus controller and the slave bus controller; and
the slave bus controller is configured to:
  close the first switchable bypass path in the power conversion circuitry in response to the communication interlude;

open the first switchable bypass path once a charging time interval has passed after closing the first switchable bypass path in the power conversion circuitry in response to the communication interlude;

open the second switchable bypass path in the power conversion circuitry in response to the first input data signal indicating that the master bus controller has initiated the communication of the data frame;

close the second switchable bypass path in the power conversion circuitry in response to the communication interlude;

close the third switchable bypass path in the power conversion circuitry in response to the communication interlude; and open the third switchable bypass path once the charging time interval has passed after closing the third switchable bypass path in the power conversion circuitry in response to the communication interlude.

20. The bus interface system of claim 18 wherein the master bus controller comprises a voltage regulation circuit and a data modulator, wherein:

the data modulator is configured to generate the first input data signal that defines a set of data pulses during a data frame;

the voltage regulation circuit is configured to convert a power source voltage into a second supply voltage that powers the data modulator; and a fourth switchable bypass path is connected between the voltage regulation circuit and the single bus line so as to bypass the data modulator, wherein the fourth switchable bypass path is switchable to be opened and to be closed.

21. The bus interface system of claim 20 wherein:

the slave bus controller is configured to:

close the first switchable bypass path in the power conversion circuitry in response to a communication interlude;

open the first switchable bypass path once a charging time interval has passed after closing the first switchable bypass path in the power conversion circuitry in response to the communication interlude;

open the second switchable bypass path in the power conversion circuitry in response to the first input data signal indicating that the master bus controller has initiated communication of the data frame;

close the second switchable bypass path in the power conversion circuitry in response to the communication interlude;

close the third switchable bypass path in the power conversion circuitry in response to the communication interlude; and open the third switchable bypass path once the charging time interval has passed after closing the third switchable bypass path in the power conversion circuitry in response to the communication interlude; and the master bus controller is configured to:

open the fourth switchable bypass path in the power conversion circuitry in response to initiating the communication of the data frame; and close the fourth switchable bypass path in the power conversion circuitry in response to the communication interlude.

22. The bus interface system of claim 2 wherein the rectifier comprises a first diode that is connected so as to be forward biased from the single bus line to the reservoir capacitor.

23. The bus interface system of claim 2 wherein the power conversion circuitry further comprises:

a second reservoir capacitor; and a diode coupled between the reservoir capacitor and the second reservoir capacitor such that the second reservoir capacitor is configured to generate a second supply voltage that is below the first supply voltage.

24. The bus interface system of claim 2 wherein the master bus controller is configured to generate the first input data signal in accordance with a Pulse Width Modulation (PWM) bus protocol.

25. A method of providing power to a slave bus controller along a single bus line consisting of a single wire from a master bus controller coupled to the single bus line, wherein no other bus line connects the master bus controller and the slave bus controller, the method comprising:

generating a first input data signal with the master bus controller;

transmitting the first input data signal along the single bus line from the master bus controller to the slave bus controller; and converting the first input data signal into a first supply voltage at the slave bus controller.

26. The method of claim 25 wherein converting the first input data signal into the first supply voltage at the slave bus controller comprises:

charging a reservoir capacitor in the slave bus controller with the first input data signal using a rectifier in the slave bus controller coupled between the single bus line and the reservoir capacitor, wherein the reservoir capacitor is coupled to generate a supply voltage;

blocking discharge from the reservoir capacitor with the rectifier; and bypassing the rectifier to charge the reservoir capacitor with the first input data signal.

27. The method of claim 26 wherein the master bus controller is configured to generate the first input data signal in accordance with a Pulse Width Modulation (PWM) protocol.

28. The method of claim 26 wherein:

the charging of the reservoir capacitor in the slave bus controller with the first input data signal using the rectifier in the slave bus controller is done with a communication telegram;

the blocking of the discharge from the reservoir capacitor with the rectifier occurs during the communication telegram; and the bypassing of the rectifier to charge the reservoir capacitor with the first input data signal occurs once the communication telegram has ended.

29. The method of claim 26 wherein generating the first input data signal with the master bus controller comprises:

converting a power source voltage to a second supply voltage that powers a data modulator in the master bus controller;

producing the first input data signal with the data modulator during a communication telegram such that the first input data signal includes a set of data pulses of the communication telegram; and bypassing the data modulator so that the second supply voltage is applied to the single bus line.

30. The bus interface system of claim 1, wherein the bus interface system is a one wire bus interface system.

31. The method of claim 25, wherein the master bus controller and the slave bus controller are both part of a one wire bus interface system.

* * * * *

UNITED STATES PATENT AND TRADEMARK OFFICE
CERTIFICATE OF CORRECTION

PATENT NO. : 10,528,502 B2
APPLICATION NO. : 14/659371
DATED : January 7, 2020
INVENTOR(S) : Christopher Truong Ngo et al.

Page 1 of 1

It is certified that error appears in the above-identified patent and that said Letters Patent is hereby corrected as shown below:

In the Specification

In Column 28, Line 63, replace "200 hms" with --20 Ohms--.

Signed and Sealed this
Tenth Day of March, 2020

Andrei Iancu
*Director of the United States Patent and Trademark Office*